(12) United States Patent
Gauthier

(10) Patent No.: US 6,277,207 B1
(45) Date of Patent: Aug. 21, 2001

(54) CONTROL SYSTEM FOR VEHICLE WASHING SYSTEM

(75) Inventor: David M. Gauthier, Denver, CO (US)

(73) Assignee: Mark VII Equipment, Inc., Arvada, CO (US)

( * ) Notice: Subject to any disclaimer, the term of this patent is extended or adjusted under 35 U.S.C. 154(b) by 0 days.

(21) Appl. No.: 09/365,519

(22) Filed: Aug. 2, 1999

(51) Int. Cl.$^7$ ...................................................... B60S 3/04
(52) U.S. Cl. ........................... 134/18; 134/34; 134/57 R; 134/123
(58) Field of Search .................. 134/18, 34, 45, 134/57 R, 123

(56) References Cited

U.S. PATENT DOCUMENTS

| | | | |
|---|---|---|---|
| 3,533,422 | * 10/1970 | Alimanestiano | 134/57 R X |
| 4,946,513 | * 8/1990 | Del Prato et al. | 134/57 R X |
| 5,076,304 | 12/1991 | Mathews . | |
| 5,447,574 | * 9/1995 | Inoue | 134/57 R X |
| 5,575,852 | 11/1996 | Chase . | |

* cited by examiner

*Primary Examiner*—Philip R. Coe
(74) *Attorney, Agent, or Firm*—Dorsey & Whitney LLP

(57) ABSTRACT

A control system for a vehicle washing system is provided. The control system utilizes a plurality of sensors to determine the length of a vehicle, the position of a vehicle relative to a fixed track upon which a gantry travels, and the profile of a vehicle relative to the track. The control system preferably begins a vehicle washing routine by commanding a gantry to travel from a beginning of the track to the end of the track while awaiting the interruption of an photoelectric beam for an entrance eye which first detects the front end of a stationary vehicle within the vehicle washing area. The gantry continues to move towards the end of the track while awaiting detection of a portion of the vehicle which is higher than a preset distance from ground. Upon detection of such vehicle portion, the control system establishes parameters setting a front safe tilt zone. In similar manner, the control system determines a rear safe tilt position for the vehicle washing system. Thereby providing a vehicle washing system which may process along a length of vehicle with deployed washing members while ensuring contact between such members and the vehicle is avoided.

41 Claims, 21 Drawing Sheets

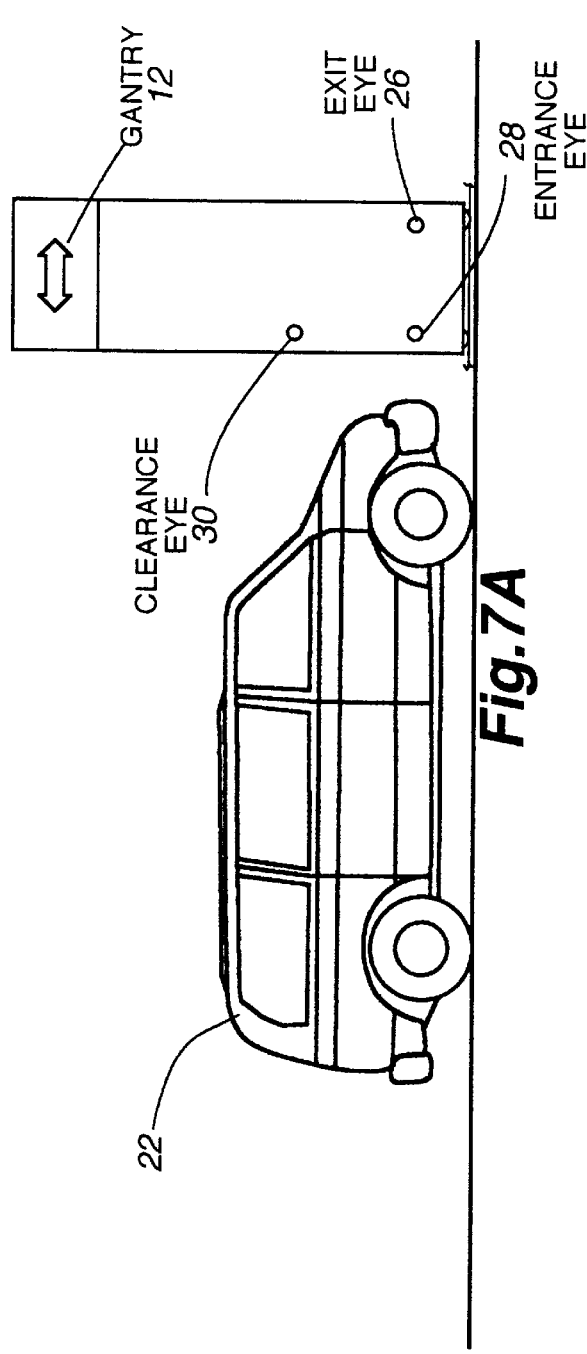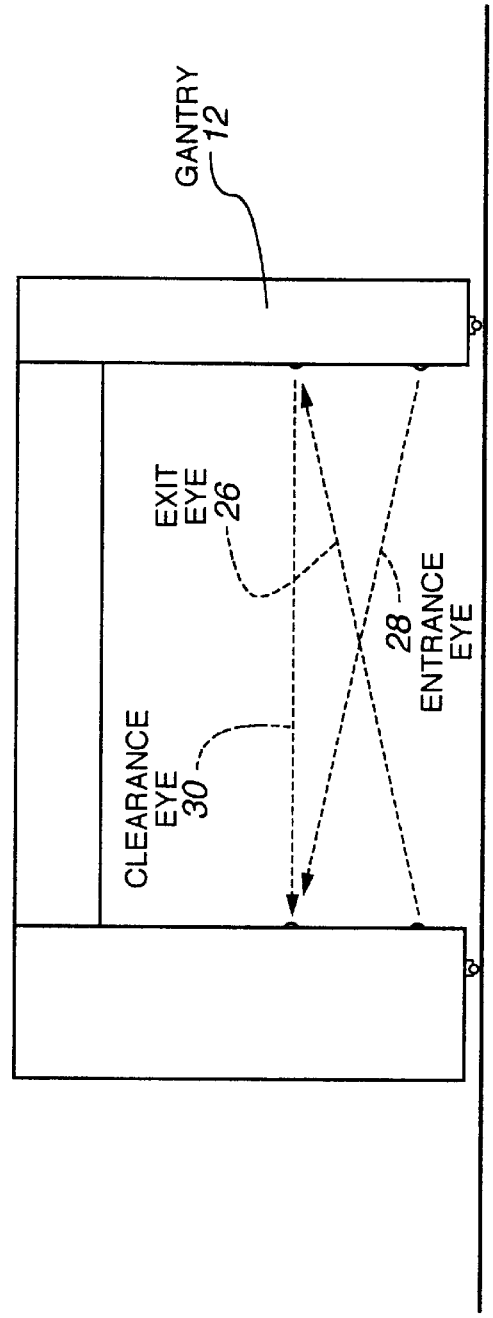

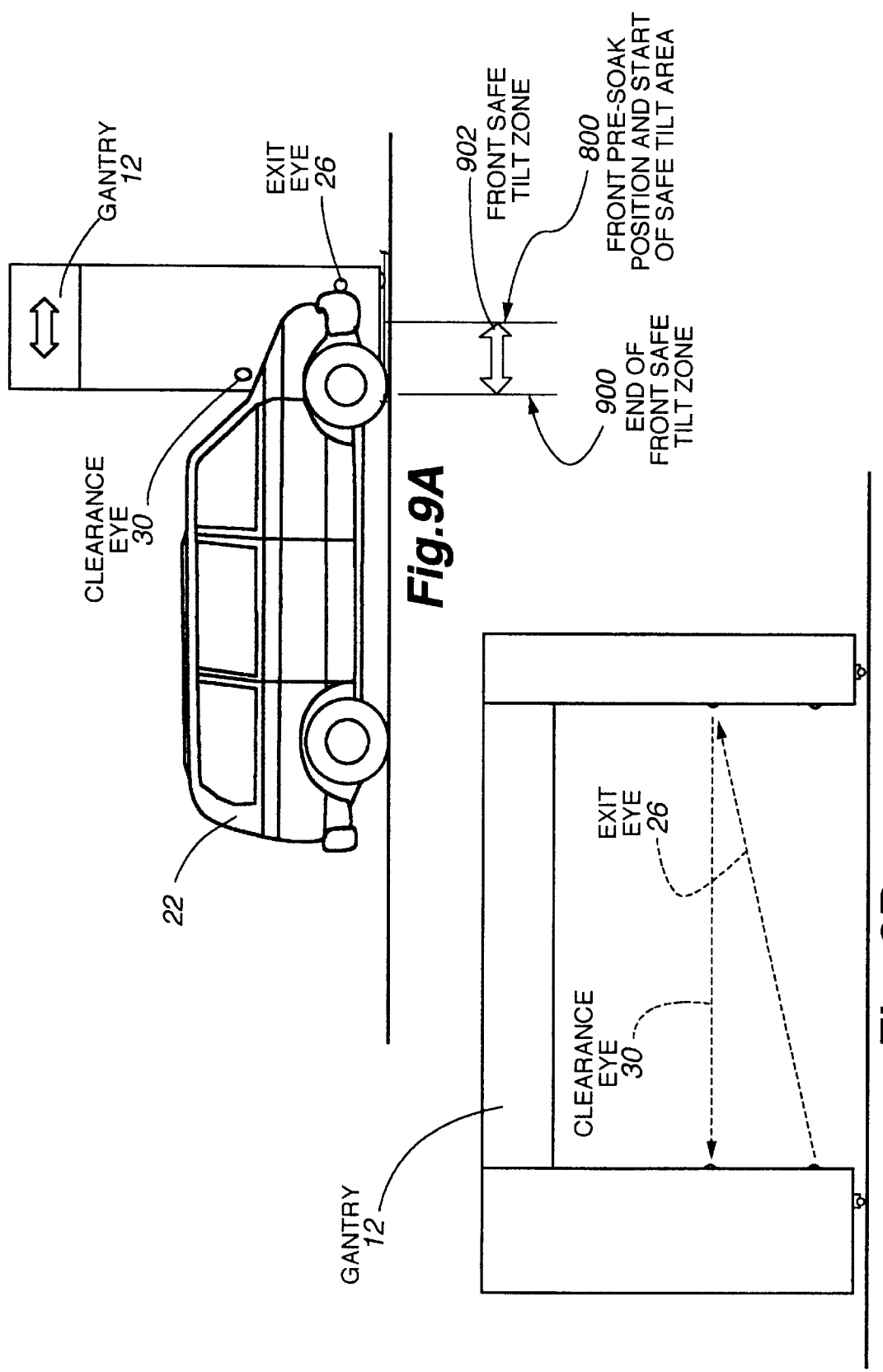

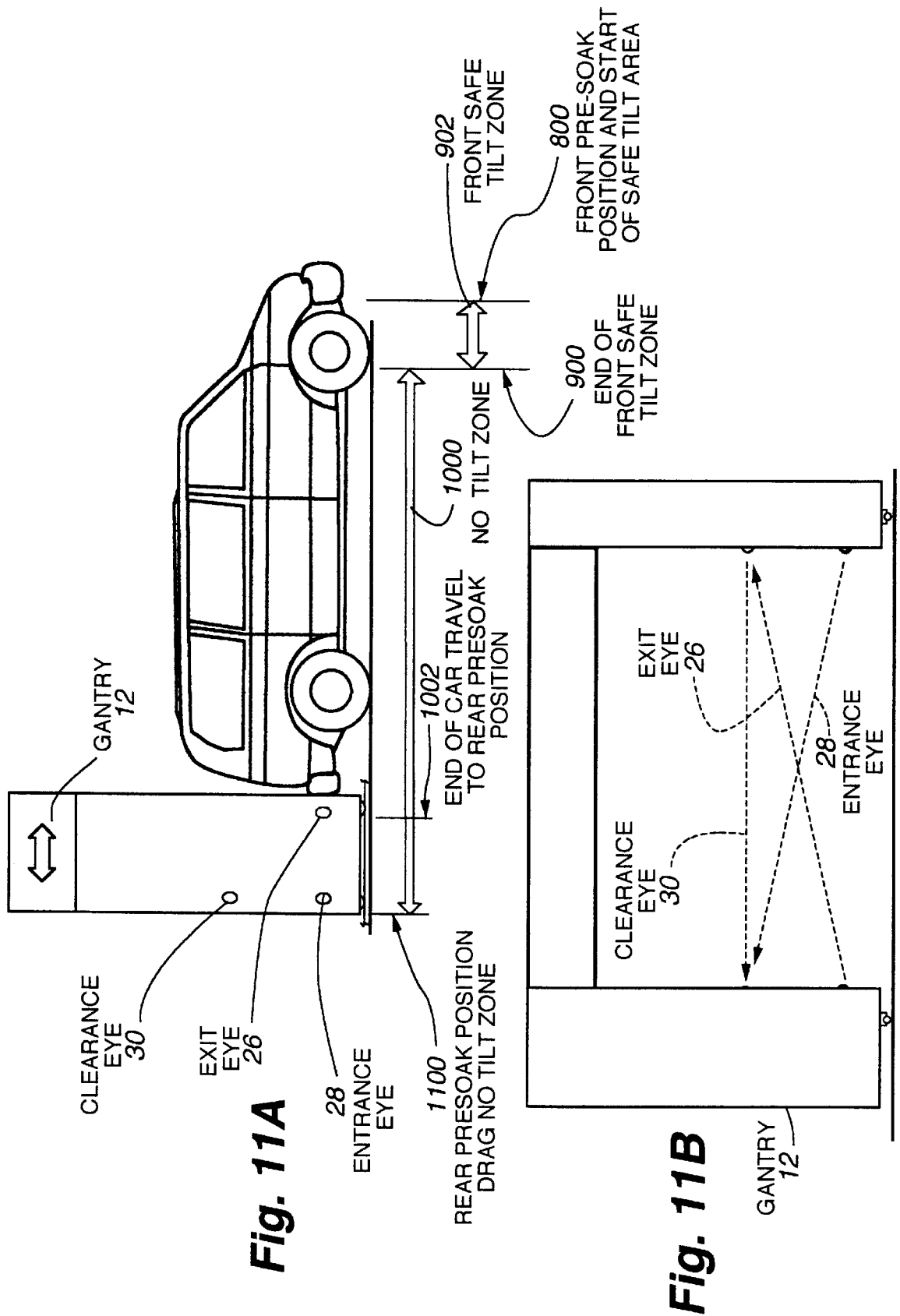

| RELAY # | FUNCTION |
|---|---|
| M0-M3 | DISPLAY CONTROLS |
| M4 | PRE-SOAK PUMP |
| M5-M7 | PRE-SOAK CONTROLS |
| M10-M17 | GANTRY CONTROLS |
| ... | ... |
| M200 | 2 PASS WASH LATCH |
| M201 | 4 PASS WASH LATCH |
| M202 | 6 PASS WASH LATCH |
| M203 | UNDERCARRIAGE LATCH |
| M204 | WAX LATCH |
| M205 | SPOT FREE LATCH |
| M206 | ROCKER PANEL LATCH |
| M207 | NUMBER OF FRONT TILT LATCH |
| M208 | NUMBER OF REAR TILT LATCH |
| ... | ... |
| M510 | WASH 1, 2 PASS |
| M511 | WASH 1, 4 PASS |
| M512 | WASH 1, 6 PASS |
| M513 | WASH 1, UNDERCARRIAGE |
| M514 | WASH 1, WAX |
| M515 | WASH 1, SPOT FREE |
| M516 | WASH 1, ROCKER PANEL |
| M517 | WASH 1, # OF FRONT TILTS |
| M518 | WASH 1, # OF REAR TILTS |
| M519 | WASH 1, COLORSHINE |
| M520 | WASH 1, 2-STEP |
| M521 | WASH 1, REGULAR DRYER |
| M522 | WASH 1, DELUX DRYER |
| M523 | WASH1, NO WASH DRYER |
| M524 | WASH 1, RECLAIM WASH |
| M525 | WASH 1, RECLAIM WAX |
| M526 | WASH 1, RECLAIM RINSE |
| M527 | WASH 1,RECLAIM UNDERCARRIAGE |
| M528-M534 | WASH 1, FUTURE OPTION |
| M535 | WASH 2, 2PASS |
| ... | ... |
| M560 | WASH 3, 2 PASS |
| ... | ... |
| M585 | WASH 4, 2 PASS |
| ... | ... |

*Fig. 12B*

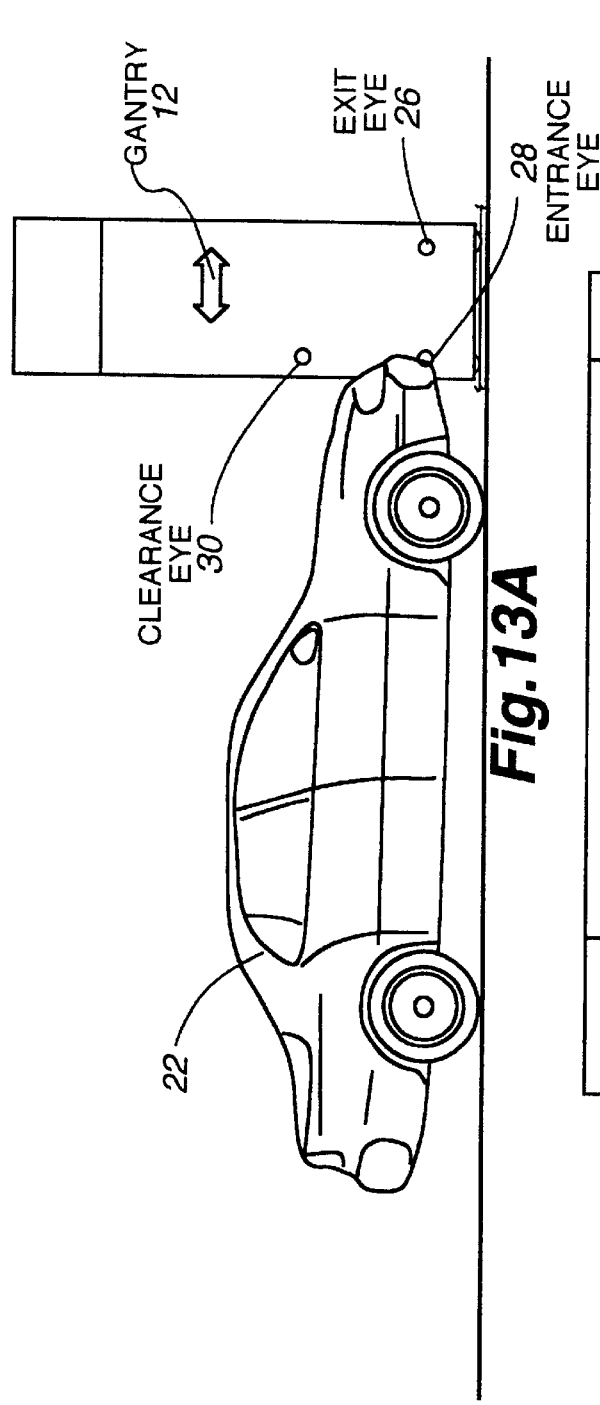
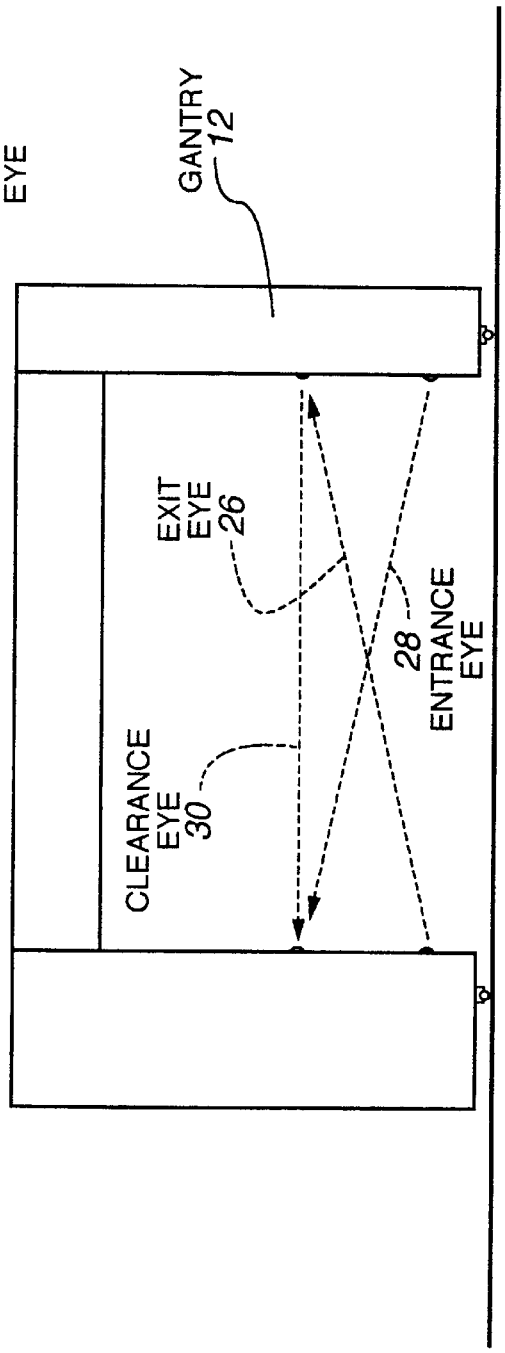

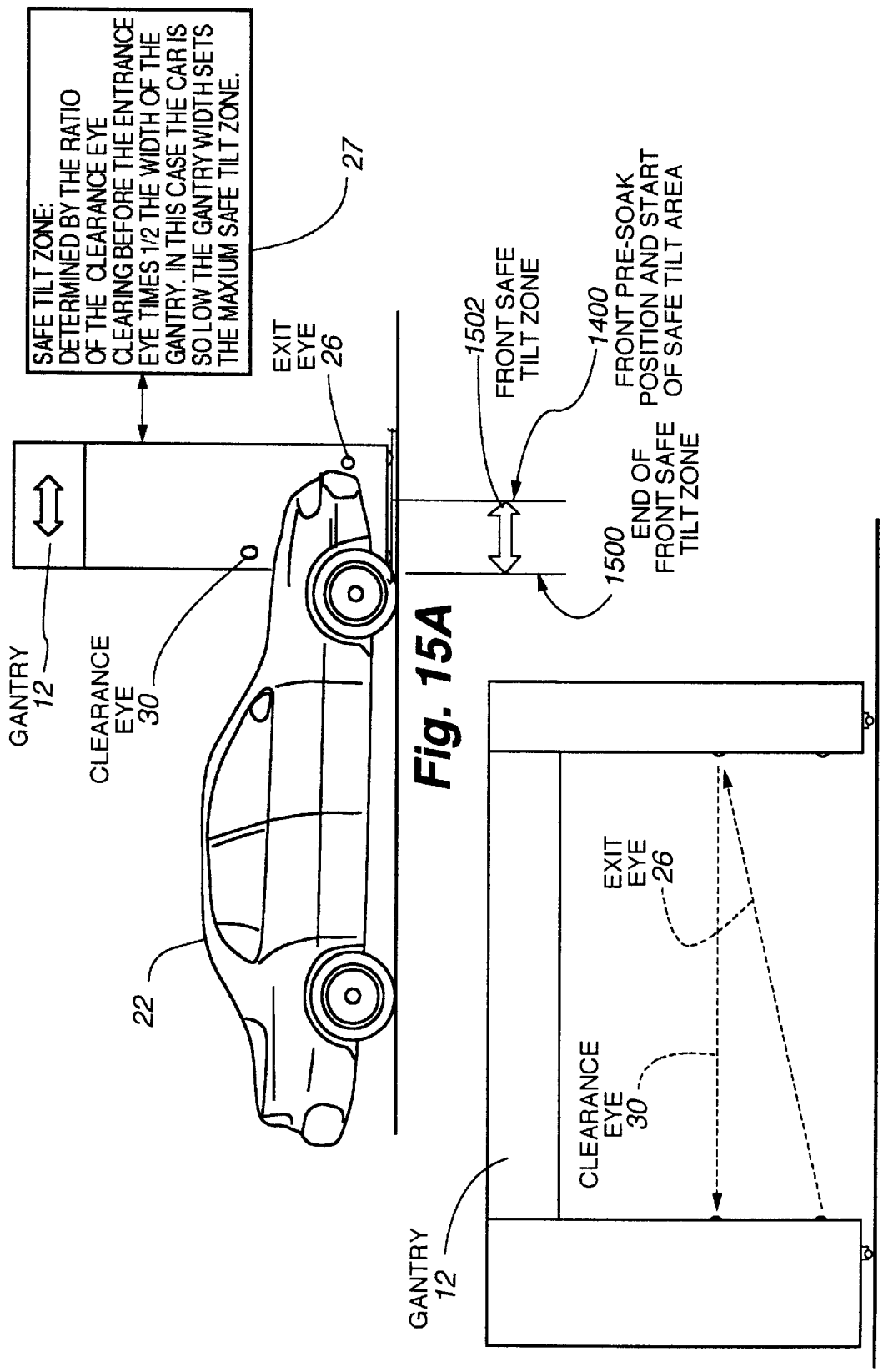

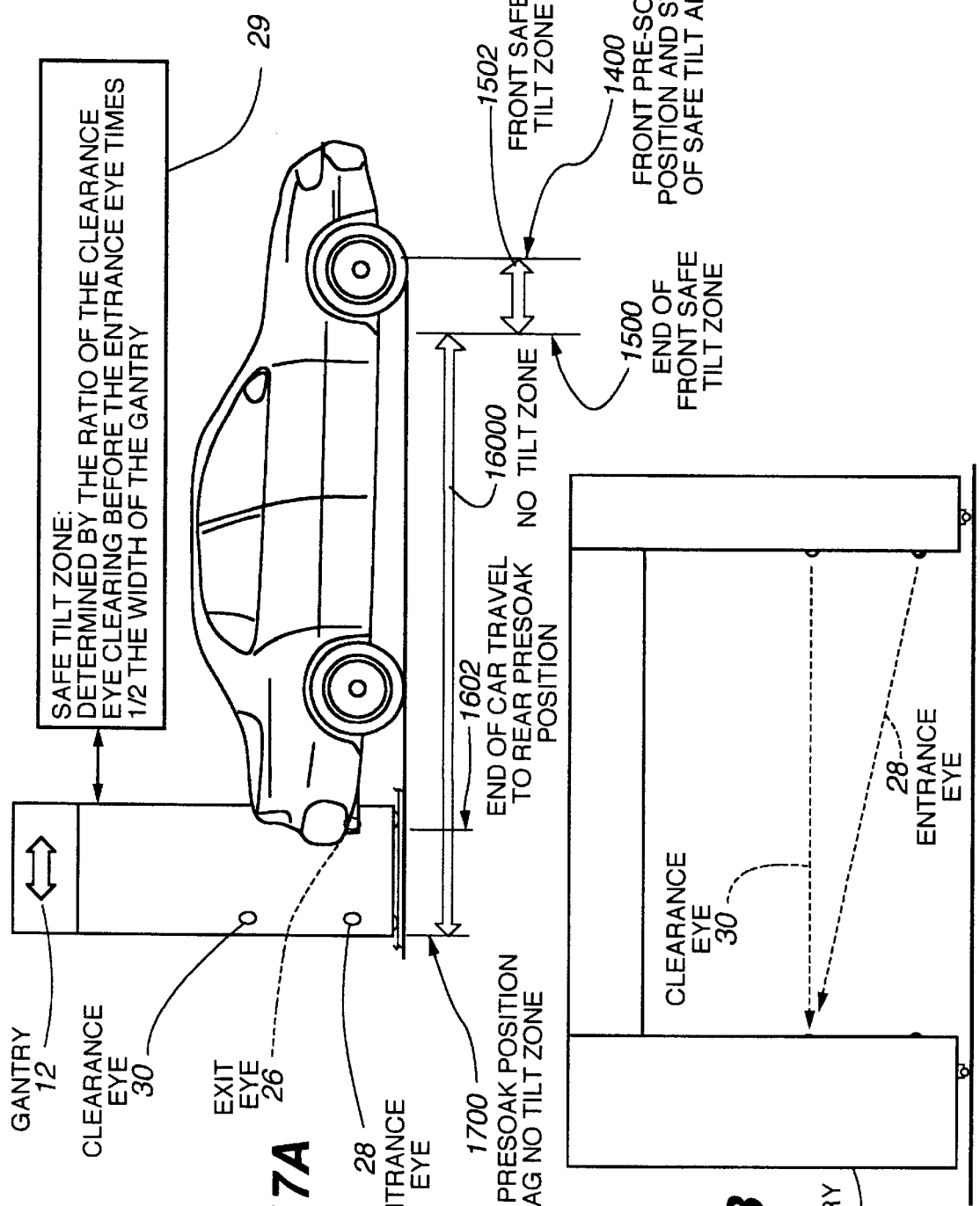

CONTROL SYSTEM FOR VEHICLE WASHING SYSTEM

FIELD OF THE INVENTION

The present invention relates generally to a control system for automatic vehicle washing systems and, more particularly, to a control system for a new and improved gantry-type washing system designed to efficiently wash the top, front, rear, and sides of a vehicle.

BACKGROUND OF THE INVENTION

"Brushless" automated vehicle washing systems are commonly utilized to quickly and efficiently clean vehicles without requiring any hand scrubbing or contact of cleaning members with the exterior of a vehicle. Brushless vehicle washing systems utilize pressurized fluid jets that are passed adjacent to the surface of the vehicle to spray clean the exterior surfaces of a vehicle. These jets are commonly arrayed in a washing frame which revolves around the vehicle or passes linearly along the vehicle, or the frame may be kept stationary while the vehicle is passed through the frame. In any case, the object is to submit the entire readily visible exterior surface of the vehicle to the spray jets to remove dirt and grease from the vehicle surface.

The cleaning ability of brushless vehicle washing systems is largely dependent upon two factors: the amount of force (i.e., the pressure) which is imparted by the pressurized cleaning fluids upon the surface of the vehicle, and the effective cleaning area of each pressurized fluid jet. As such, when the pressurized fluid jets are positioned closer to the vehicle, a higher pressure and greater cleaning force is imparted upon the vehicle while the effective cleaning area (i.e., the area of the vehicle exposed to the fluids) is significantly limited. Similarly, when the pressurized fluid jets are positioned at a greater distance from the vehicle, the amount of force (the scrubbing force) imparted by the pressurized fluids upon the surface of the vehicle is reduced while the effective cleaning area is increased. Accordingly, those parts of the vehicle which are furthest from the washing frame may not be adequately cleaned. Since the proximity of the jets to the vehicle determines the effective cleaning force and the area to be cleaned, numerous approaches have been implemented to attempt to position the jets at an optimal distance from each surface (i.e., the front, rear, sides, top, and undercarriage) of a vehicle.

One approach utilizes a washing system which moves parallel along the length of the vehicle on both sides. Such systems typically have spray nozzles disposed along the sides of the vehicle adapted to spray cleansing solutions onto the sides of the vehicle. Since the nozzles are oriented along the sides of the vehicle, they often do not provide sufficient coverage on the front and rear surfaces of the vehicle and, therefore, typically the wash system will have to make a pass in each direction along the length of the vehicle so that the front and rear of the vehicle are sprayed twice in an attempt to get a sufficient amount of solution onto the surfaces for adequate cleansing of the vehicle. Making a double pass is time consuming and also is a waste of solution to the extent that it is sprayed twice on the sides of the vehicle where adequate coverage is obtainable in one pass.

Attempting to eliminate the need to make multiple passes, another approach utilizes a track which is curved and thereby enables a washing frame to be moved in front of and behind the vehicle. While such a system improves upon fixed position systems, this approach often requires the washing system to be suspended from an overhead surface at a significant distance from many vehicles. Since any non-commercial vehicle can ideally be cleaned by an automated vehicle washing system, present systems are configured such that washing apparatus are positioned a safe distance from all sides (including the front and rear) of the largest available non-commercial vehicles. Thus, the overhead tracks are commonly positioned a significant distance from the front, rear, and sides of the largest non-commercial vehicles (for example, a vehicle which is greater than 19 feet long) in order to provide a safe margin of separation between the washing system and the vehicle. As a result, the fronts and rears of compact cars and even standard sized cars are often positioned a significant distance away from the pressurized fluid jets. Such non-optimal configuration results in a reduction in the effective cleaning force imparted by the pressurized fluids upon the vehicle to be cleaned, and typically wastes resources by requiring a longer cleaning period, multiple passes, and the like in order to ensure each vehicle (regardless of size) is effectively cleaned. Thus, this approach also has significant deficiencies.

While the above mentioned approaches are improvements over stationary brushless vehicle washing systems, they are not the optimal approach because they are either configured to effectively clean a mid-size vehicle or the largest vehicles. Trucks, vans, station wagons, sport cars, economy cars, and the like all have unique lengths and profiles. These tremendous variations in vehicle lengths and profiles present unique cleaning challenges for automated vehicle washing systems.

Additionally, since the length and profile of each vehicle entering the wash area may significantly vary, conventional vehicle washing systems often are configured to begin and end each wash cycle at pre-set locations, for example at the entrance and exit ends of the track in the vehicle wash area As a result, commonly available vehicle washing systems often waste resources by beginning and ending wash cycles at a significant distance from the front or rear of a specific vehicle. For example, when compact sized vehicles enter the wash area, significant amounts of water, cleaning solutions, waxes, and the like are often wasted by being sprayed into areas in front or behind the vehicle.

Operators of conventional vehicle wash systems often attempt to conserve resources by limiting the time period of each wash cycle and moving the gantry along the length of the track at a higher than optimal speed. For long vehicles, moving the gantry at such speeds often results in the front and rear of the vehicle not being completely washed. Thus, a prevalent deficiency in conventional automated vehicle washing systems is the inability of such systems to adjust the operation of the washing system and position washing apparatus at an optimal distance form each vehicle.

SUMMARY OF THE INVENTION

The present invention overcomes many of the above identified deficiencies in currently available vehicle washing systems by providing a vehicle washing system which utilizes a centralized processing unit in conjunction with a plurality of sensors to determine the length and profile of a vehicle to thereby adjust the operation of the system to each vehicle. By determining the length and profile of a vehicle, the present invention enables a vehicle washing system to position washing apparatus (such as, booms, wands, and jets) at an optimal distance from each vehicle, regardless of the length and/or profile of a vehicle. Positioning washing apparatus at an optimal distance from each vehicle, ensures that high pressure jets are directed toward a vehicle from a preferred distance rather than from a pre-set distance which may be too close or too far to the vehicle.

The present invention also reduces the quantity of washing resources (for example, water, cleaning solutions, drying time, total washing time, etc.) needed to clean each vehicle. By determining the length, profile, and relative position of each vehicle with respect to the vehicle washing system, the present invention facilitates the positioning of the washing system a preferred distance from either end of a vehicle before a wash cycle is commenced and turns off the washing apparatus after the vehicle washing system has traveled a minimal distance past the end of a vehicle. As a result, washing resources are directed onto the vehicle to be cleaned instead of the floor of the wash area, or the like. Additionally, by determining the front and rear locations of the vehicle relative to the washing system, the present invention minimizes the distance the washing system must travel to clean the length of a vehicle thereby saving both time and resources.

In accordance therewith, the present invention provides a control system for an improved reciprocating gantry-type vehicle washing system. The control system utilizes a series of photosensitive eyes to determine the length and profile of each vehicle. The photosensitive eyes are suitably mounted at locations on the gantry structure such that as the gantry is moved towards the front of a vehicle the light transmitted between the photosensitive eyes is interrupted when the leading edge of the gantry (as determined by the direction of travel of the gantry) is substantially parallel with the front end of the vehicle. Similarly, as the gantry continues along the length of each vehicle the light transmitted between the photosensitive eyes is disrupted until the leading edge of the gantry is past the rear end of the vehicle. By comparing the location of the gantry when the sensors are interrupted and then restored to a fixed coordinate system, the present invention determines the length of each vehicle entering the vehicle wash.

Additionally, the present invention preferably includes sensors which determine the height profile of each vehicle entering the vehicle wash. Photosensitive eyes are preferably positioned at a predetermined distance above the height of the floor of the vehicle wash. As the gantry moves along the length of a vehicle parked within the wash, a clearance profile is obtained for each vehicle by the interruption and restoration of signals between the photosensitive eyes. The present invention preferably utilizes the height profile information to position the vehicle cleaning apparatus at an optimal distance from the vehicle thereby improving the effectiveness and efficiency of each vehicle wash cycle.

As such, the present invention preferably overcomes many of the shortcomings of current brushless vehicle washing systems by providing a system which more precisely positions vehicle cleaning apparatus at optimal distances from all surfaces of a vehicle.

Other aspects, features and details of the present invention can be more completely understood by reference to the following detailed description of a preferred embodiment, taken in conjunction with the drawings and from the appended claims.

BRIEF DESCRIPTION OF THE DRAWING FIGURES

FIGS. 7A–7B is an illustration of the vehicle sensing features of a preferred embodiment of the present invention wherein the gantry has begun to move towards the entrance of the vehicle wash and the entrance eye has not detected the front of a stocky profile vehicle.

FIGS. 9A–9B is an illustration of the vehicle sensing features of a preferred embodiment of the present invention wherein the gantry has further moved such distance that the clearance eye has detected the height profile of a stocky profile vehicle.

FIGS. 11A–11B is an illustration of the vehicle sensing features of the a preferred embodiment of the present invention wherein the gantry has moved along the length of a stocky profile vehicle such that the rear end of the vehicle has been detected.

FIGS. 12A–12B is a block diagram of a control unit utilized in a preferred embodiment of the present invention.

FIGS. 13A–13B is an illustration of the vehicle sensing features of a preferred embodiment of the present invention wherein the gantry has begun to move towards the entrance of the vehicle wash and the entrance eye has not detected the front of a slim profile vehicle.

FIGS. 15A–15B is an illustration of the vehicle sensing features of a preferred embodiment of the present invention wherein the gantry has further moved such distance that the clearance eye has detected the height profile of a slim profile vehicle.

FIGS. 17A–17B is an illustration of the vehicle sensing features of the a preferred embodiment of the present invention wherein the gantry has moved along the length of a slim profile vehicle such that the rear end of the vehicle has been detected.

DESCRIPTION OF THE PREFERRED EMBODIMENT OF THE INVENTION

Figure 1:
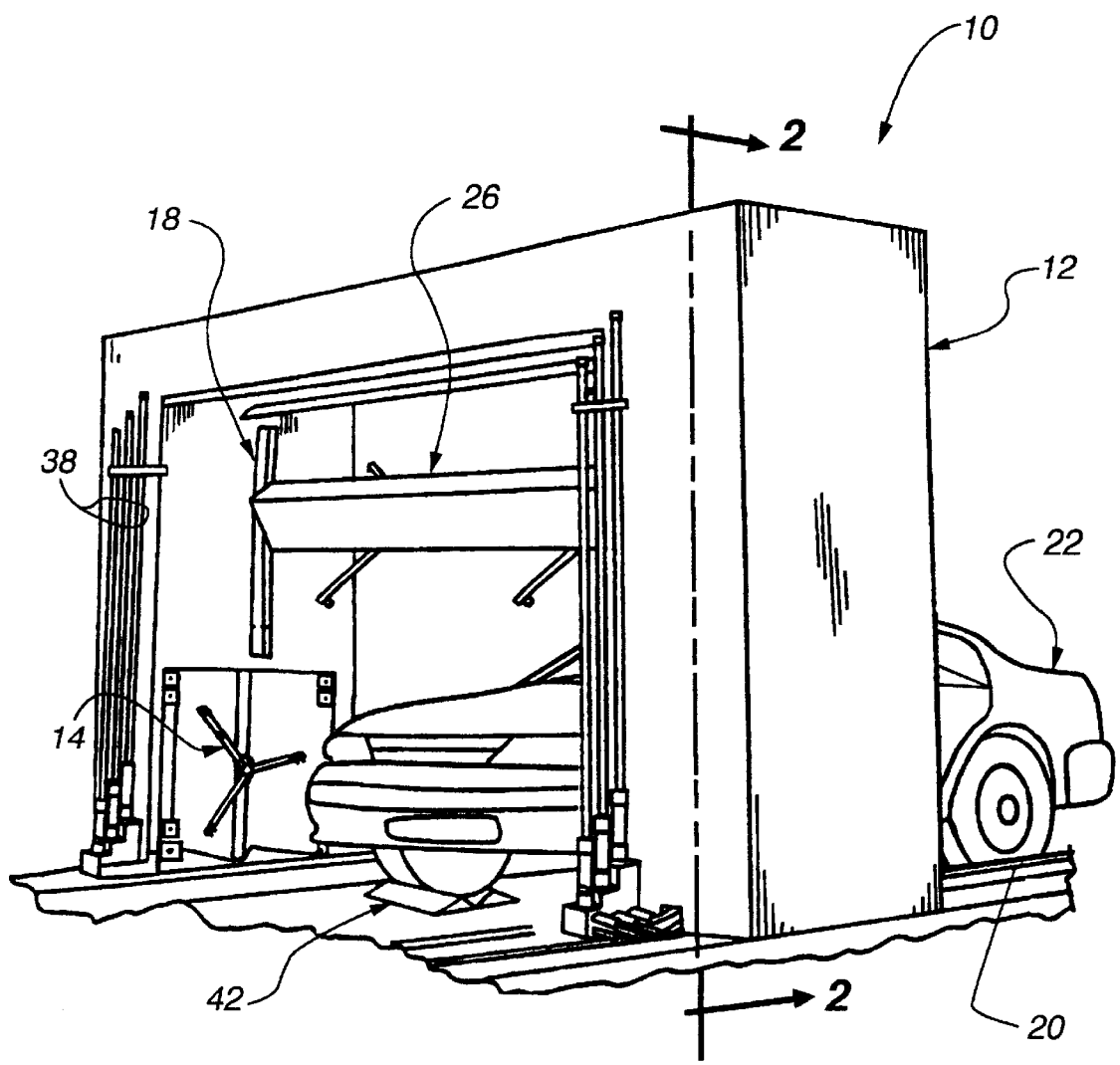
FIG. 1 is a perspective view of a preferred embodiment of the vehicle washing system of the present invention with a vehicle being shown in a position to be cleaned by the vehicle washing system.
Figure 2:
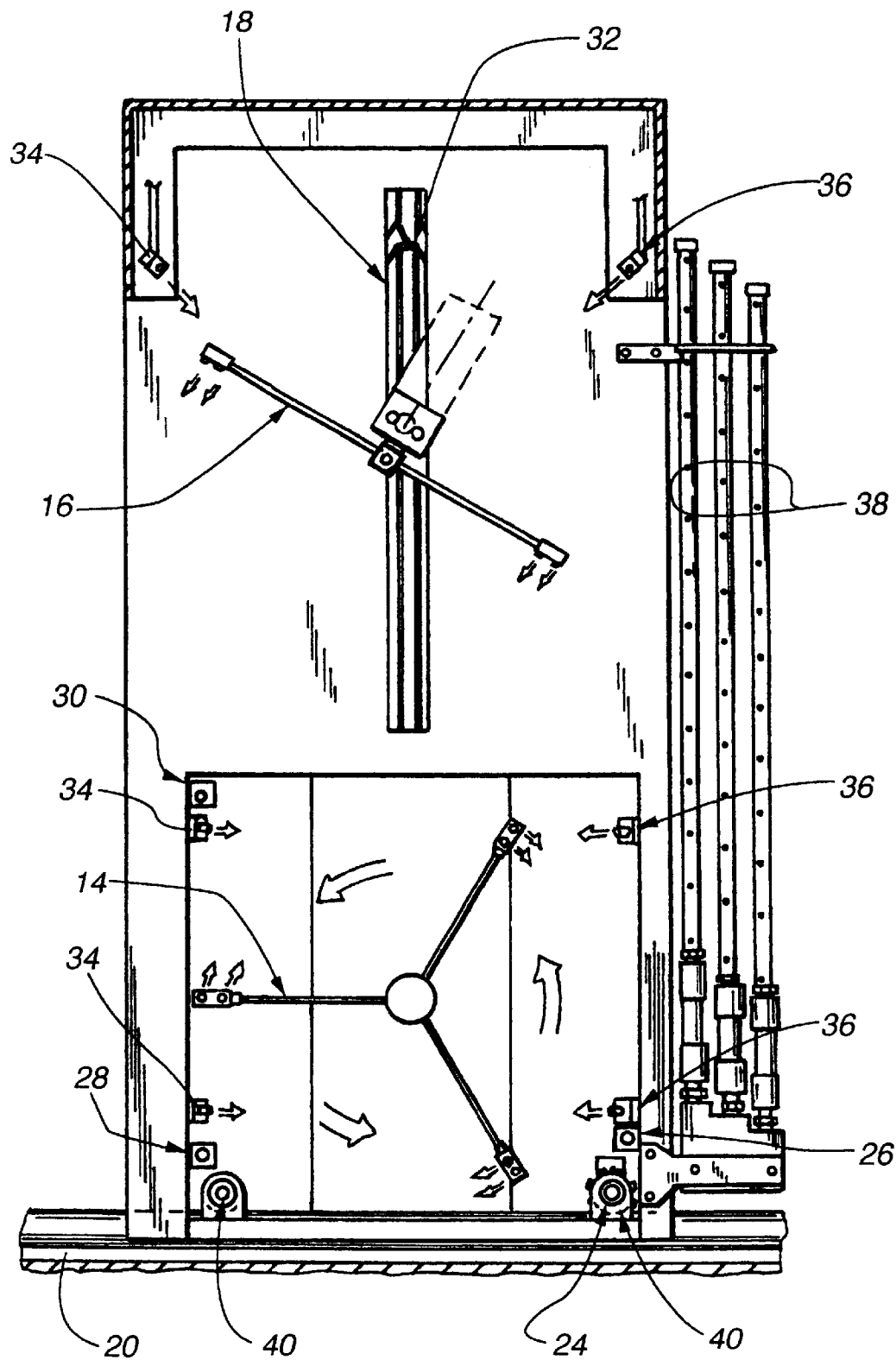
FIG. 2 is a fragmentary section taken along line 2—2 of FIG. 1.
Figure 6:
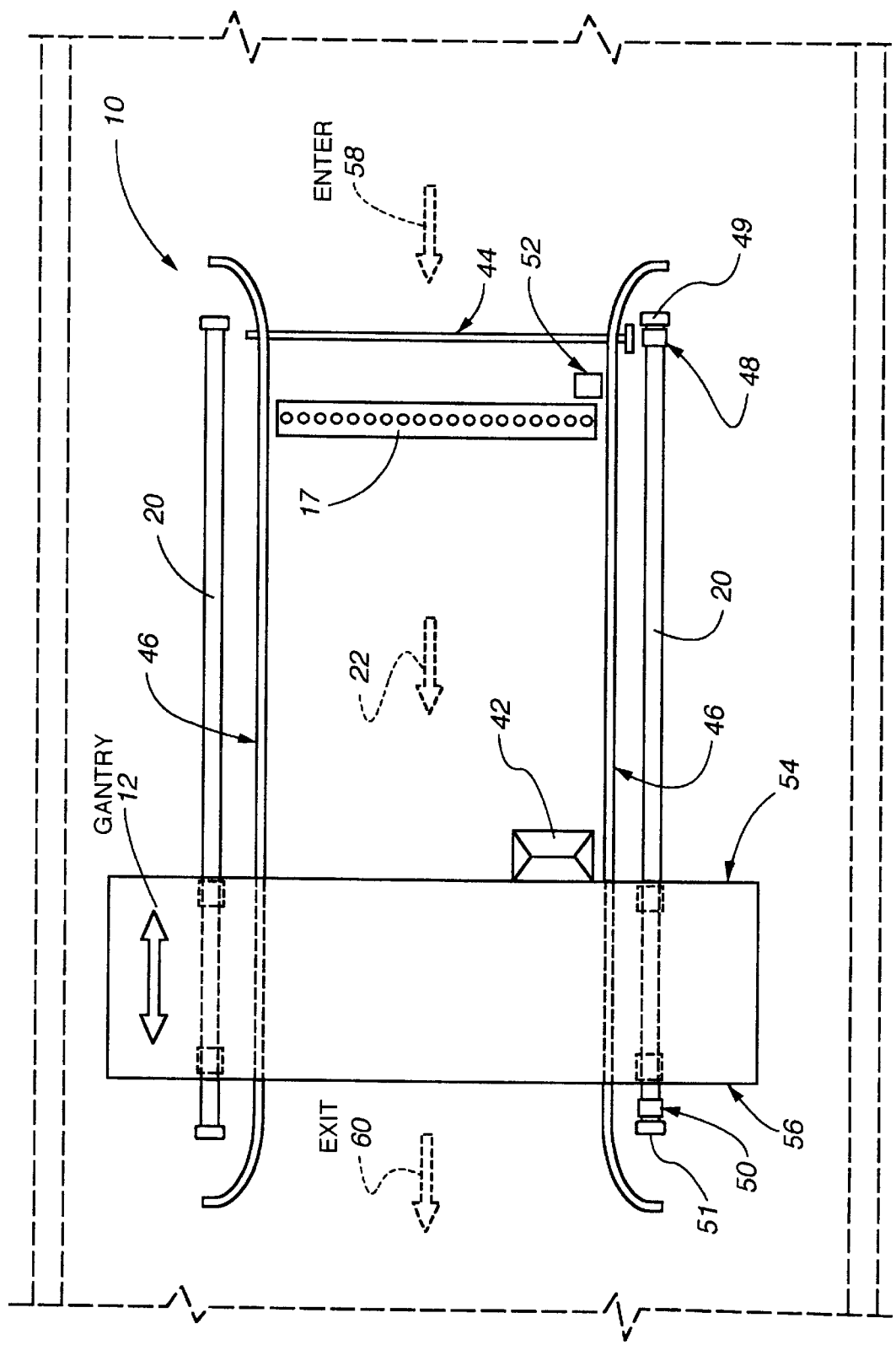
FIG. 6 is a view looking down on a preferred embodiment of the vehicle washing system of the present invention.

As shown in FIGS. 1, 2, and 6, a preferred embodiment of the vehicle washing system 10 of the present invention can be seen to be of the gantry-type, and includes a gantry structure 12 and a number of washing components including dual side surface washing mechanisms (hereafter, "side wands ") 14, an upper surface washing mechanism (hereafter, "top boom ") 16, a plurality of front nozzles 34 and rear nozzles 36, an undercarriage washing mechanism (hereafter, "undercarriage wash ") 17, and an auxiliary treatment system 38. The present invention also preferably includes a top boom positioning mechanism 18 (hereafter "top boom drive "), track 20 upon which the gantry 12 moves, gantry wheels 40, and vehicle guide rails 46. Additionally, a vehicle 22 is shown in the vehicle washing system 10 and is included to provide a point of reference only and is not to be considered as an element of the present invention. The mechanical and structural features and operations of these and other aspects of the vehicle washing system 10 of the present invention are more fully explained in U.S. Pat. application Ser. No. 08/220,817 filed on Dec. 23, 1998 which is commonly owned with the present application and hereby incorporated by reference.

As further shown in FIGS. 1, 2, and 6, the present invention also includes various sensor and units, including entrance eye sensor 28, exit eye sensor 26, clearance eye sensor 30, top boom safety switch 32, vehicle entrance sensor 44 which is preferably an "air hose switch ", gantry travel limit entrance sensor 48, gantry travel limit exit sensor 50, treadle 42 switch, gantry pulser 24, and undercarriage sensor 52. Additional sensors and units (not shown) include gantry speed inverters (which control the speed of the gantry 12), tank temperature sensors, top boom pulser (used to determine the position of top boom 16), and a wash option selection panel. Entrance eye sensor 28 is preferably positioned on gantry 12 such that it will detect the front of any standard sized vehicle. Exit eye sensor 26 is similarly positioned on gantry 12 such that it will also detect the position of any standard sized vehicle within the vehicle washing area 11. The vehicle washing area 11 for purposes of this discussion is considered to be that area within which gantry 12 may spray cleaning solutions. More specifically, the vehicle washing area is that area bounded by the width and interior height of gantry 12, and the length of tracks 20.

Clearance eye sensor 30 is preferably positioned on gantry 12 such that it's "beam " is below the lowest portion of top boom 16 when deployed (i.e., when top boom drive 18 has lowered top boom 16 to its lowest position above ground). In the preferred embodiment, clearance eye sensor 30 is positioned 44 inches from the floor of the vehicle wash envelope 11. Clearance eye sensor 30 also preferably operates at a frequency which is not susceptible to interference from entrance eyes sensor 28, exit eyes sensor 26, or any other sensor. Clearance eye sensor 30 selectively allows the top boom 16 to advance over the front hood of low profile vehicles while detecting high profile vehicles which would cause an impact with a deployed top boom 16.

Figure 12A:
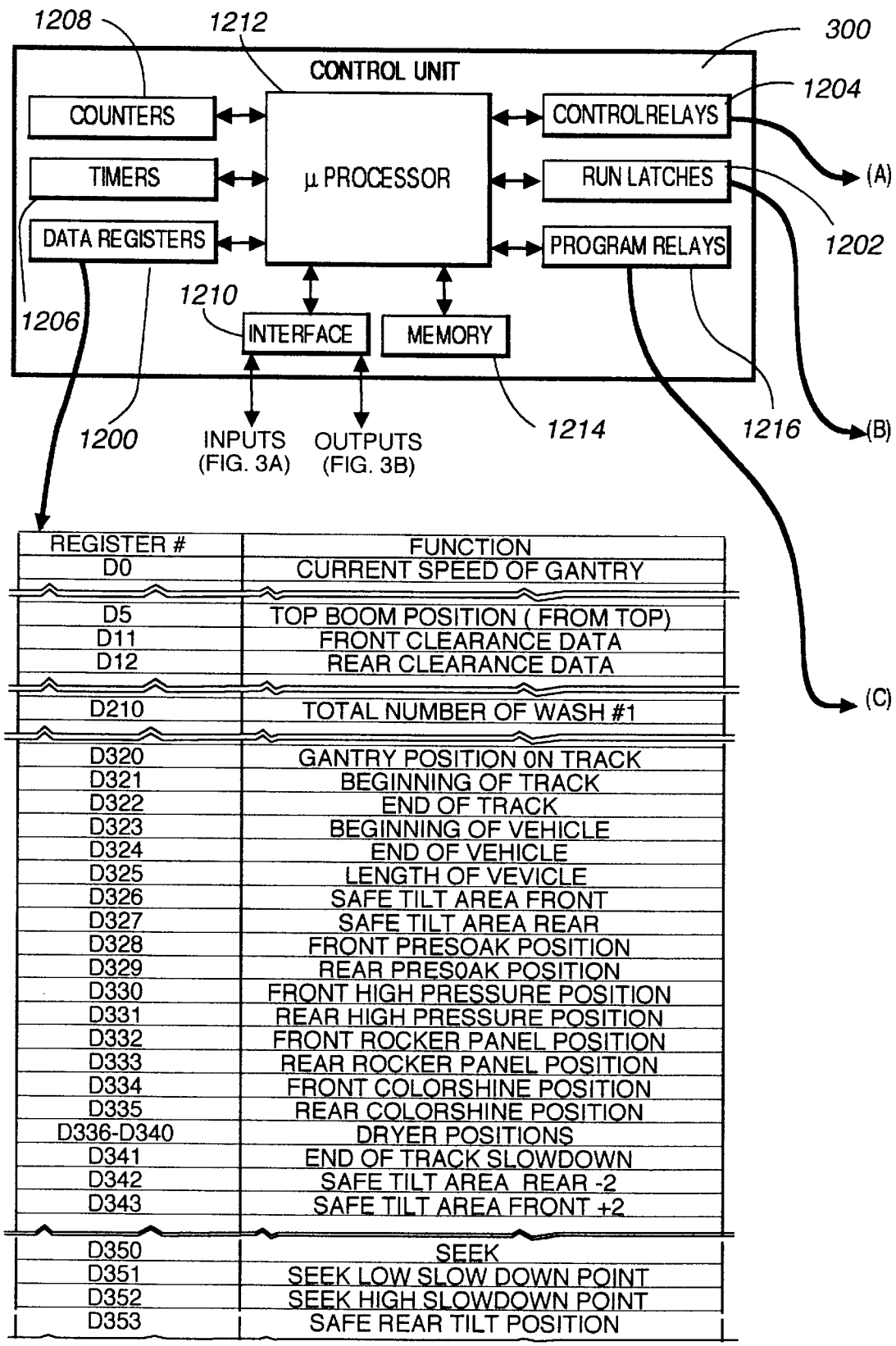

As shown in FIG. 12, the present invention also includes control unit 300 which suitably controls the operation of vehicle washing system 10. Control unit 300 receives a plurality of input signals from a multitude of sensors and generates output signals which control all aspects of the operation of the vehicle washing system 10. Control unit 300 is any suitable processing unit which controls the features and functions of the present invention. Control unit 300 preferable includes: data registers 1200, run latches 1202, control relays 1204, timers 1206, counters 1208, interface unit 1210, Central Processing Unit (CPU)1212, memory 1214, and program relays 1216.

In the preferred embodiment, control unit 300 utilizes a plurality of control (or output) relays 1204 to store configuration information and wash selections utilized for a specific wash. Each component of the present invention, which is controlled by control unit 300, is preferably assigned at least one relay. While executing the vehicle wash program, which is preferably stored in memory 1210, CPU 1212 periodically queries control relays 1204 to determine whether a control relay 1204 is "on " or "off". If "on " during a query, CPU 1212 generates an output signal such as one of the many shown in FIG. 3B. Control unit 300 suitably transmits output signals via interface unit 1210 to the various washing apparatus, sensors, and other components of the present invention. For example, relay M4 is preferably assigned to the pre-soak pump. If relay M4 is configured to its "on " state, when queried by CPU 1212, a pre-soak pump signal 340 is output by CPU 1212, via the interface unit 1210, to the pre-soak pump, which is then activated. Similar control relays 1204 preferably exist for each and every function of the present invention which is controlled by the control unit 300.

Run Latches 1202 are also utilized by control unit 300 to set the configuration of a unique wash. Individual latches are assigned to each wash option. For example, latch M200 is assigned to a two (2) pass wash, whereas M204 is assigned to the spot free rinse option. If M200 is set, a two pass wash (i.e., two passes of the gantry 12 along the length of vehicle 22) is provided. Similarly, if M204 is set the wash preferably includes a spot free rinse.

Program relays 1216 preferably store pre-programmed wash options. In the preferred embodiment, one of four different wash options may be selected by a customer. Each of these options is suitably stored in program relays 1216 which are preferably reconfigured only when control unit 300 is reprogrammed. In FIG. 12, a series of program relays (MS10–M533) are shown for a first wash option, each relay corresponds to a preprogrammed wash option. When a customer selects a wash option, CPU 1212 suitably queries the appropriate relays (for example M510–M534 for Wash Option 1, M535–M559 for Wash Option 2, M560–584 for Wash Option 3, or M585–M609 for Wash Option 4), and utilizes the settings of program relays 1216 to set the appropriate and corresponding run latches 1202.

Control unit 300 also preferably utilizes a plurality of data registers 1200 to store constants and variables determined and used during a vehicle wash by CPU 1212. As shown in FIG. 12, data registers 1200 suitably exist for variables such as beginning of track D321, beginning of vehicle D323, end of vehicle D324, and the like. Many of these variables and/or data registers are discussed in greater detail below.

Additionally, control unit 300 suitably contains various other registers, relays, and other components commonly utilized to detect error conditions, set environmental conditions, and the like. While the preferred embodiment utilizes memory modules, latches, registers, and relays to store program steps, configuration information, data variables, and the like it is to be understood that any data storage devices may be utilized by the present invention to store such information, including, but not limited to, disc drives, compact discs, random access memory, read only memory, erasable programmable memory units, and magnetic tape. Control unit 300 is preferably programmable and suitably performs all control functions necessary for operation of the present invention. However, any control unit (whether it be a stand-alone controller, a card in a microcomputer, a mini-computer, mainframe computer, or the like) which provides the desired control features and operations may be suitably utilized by the present invention. In the preferred embodiment of the present invention, control unit 300 is a 256 Input/Output PLC such as an FX-64 MR Enhanced Programmable Controller manufactured by the Mistubishi Corporation.

Figure 3A:
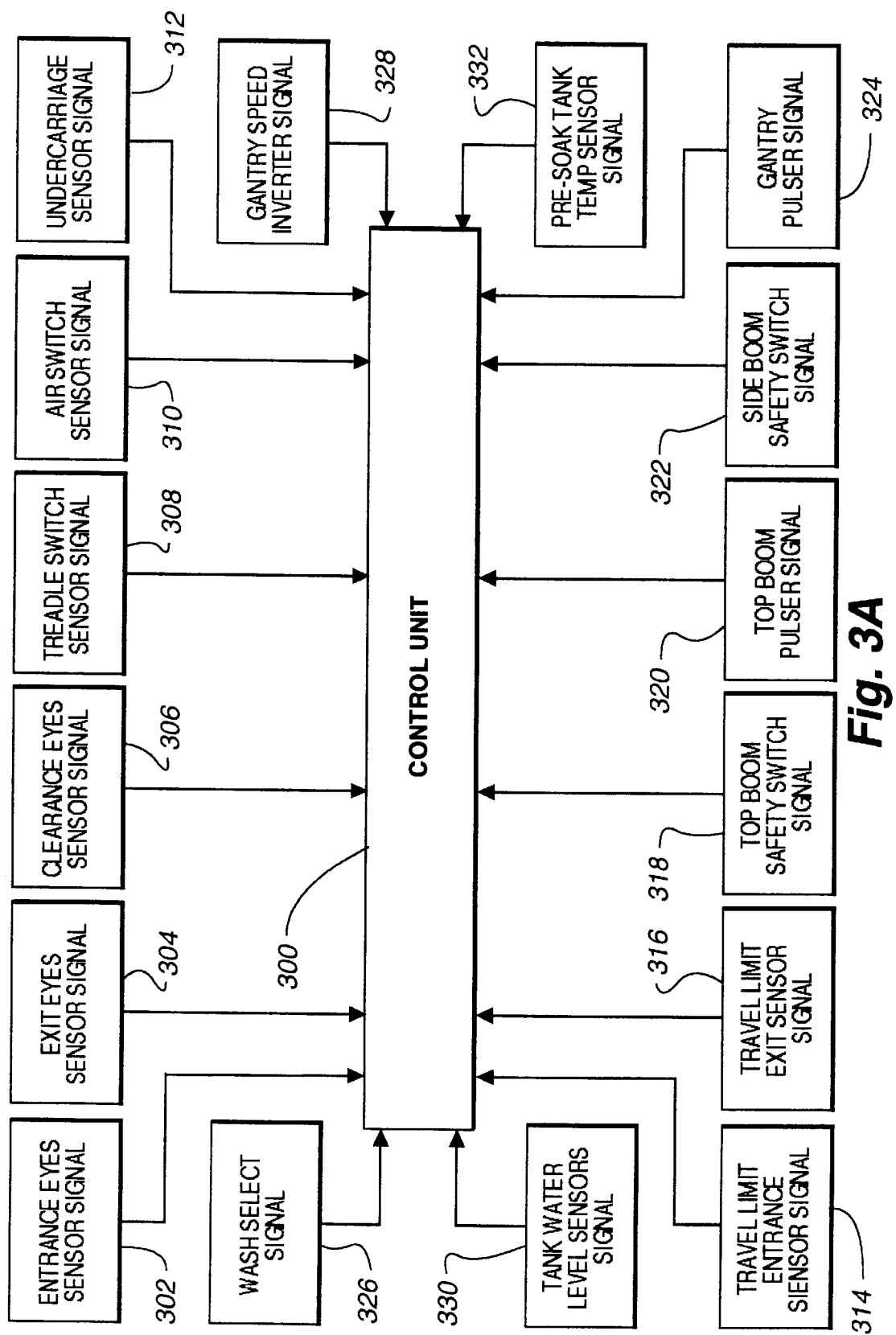
FIG. 3A is a block diagram of the various inputs to the control unit utilized in a preferred embodiment of the present invention.
Figure 3B:
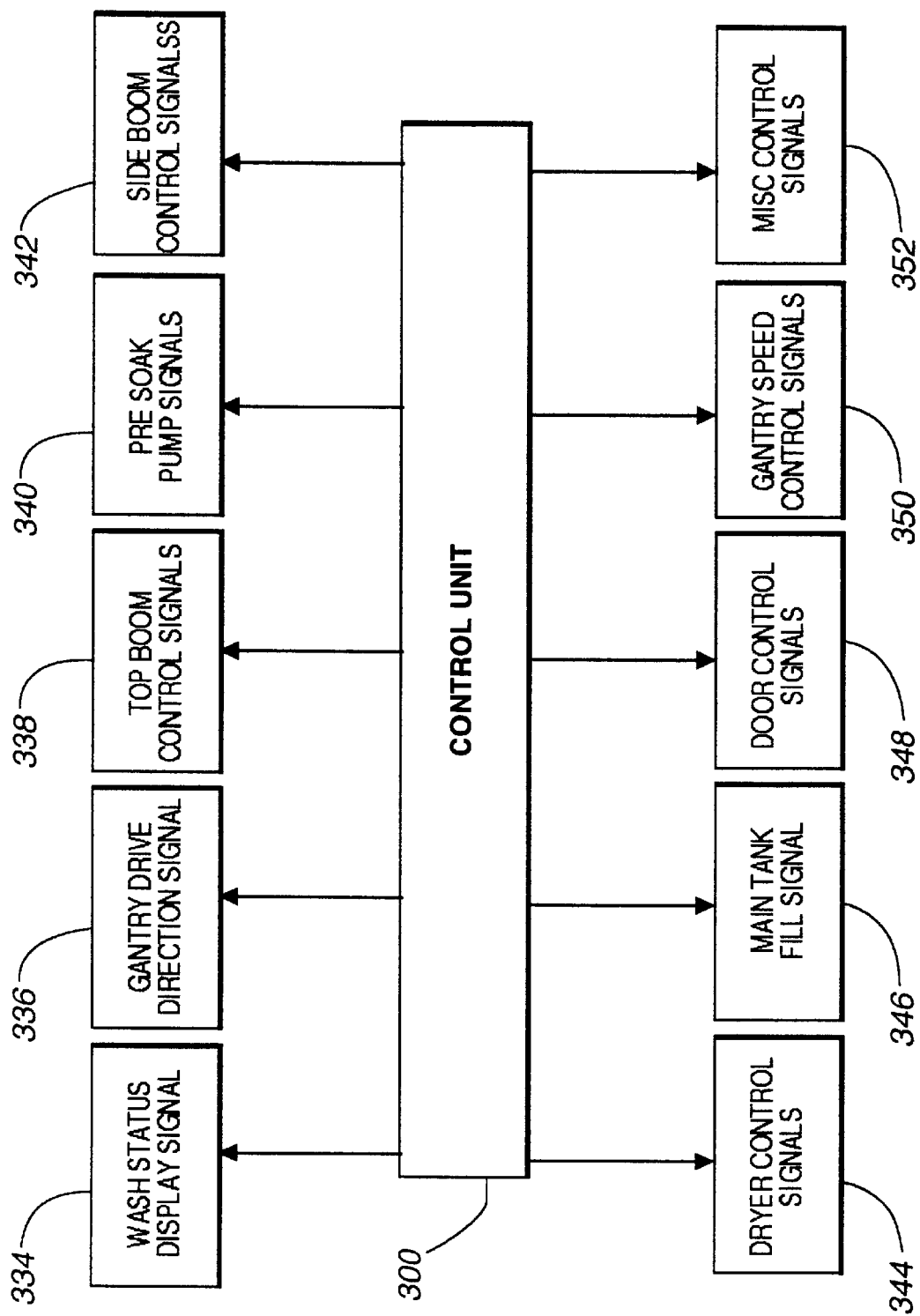
FIG. 3B is a block diagram of the various outputs of the control unit utilized in a preferred embodiment of the present invention.

As shown in FIGS. 3A and 3B, control unit 300 receives a plurality of input signals from numerous sensors. The input signals and output signals to/from control unit 300 may be transmitted via any means available including, but not limited to, hard-wired connections, wireless links, or the like. In the preferred embodiment, such input and output signals are communicated to/from control unit 300 via a hard-wired connection. Additionally, while the present invention is depicted herein as receiving and transmitting a predetermined number of input and output signals, it is to be understood that the invention is not to be so limited, additional input and/or output signals may be utilized by the present invention as necessary.

As previously mentioned (and as shown in FIG. 2), vehicle washing system 10 preferably includes entrance eye sensor 28, exit eye sensor 26, and clearance eye sensor 30. These sensors are preferably photoelectric eyes which upon interruption of each of the "beams" generated by each sensor transmits a signal (more specifically, entrance eyes sensor signal 302, exit eyes sensor signal 304, and clearance eyes sensor signal 306, respectively (FIG. 3A)) to control unit 300. Each sensor preferably utilizes a "beam" of electromagnetic energy, such as infra-red, visible light, or such. However, the present invention is not to be limited to the use of photoelectric eyes as such sensors, since any sensor capable of safely performing the features and functions of the present invention is to be considered as being within the scope of the present invention. Additionally, the "beam" utilized by each sensor may include multi-beam arrays (which preferably provide greater vehicle detection capabilities), narrow or wide beam arrays, or the like. In short, the present invention may include any detection scheme desired, however, in the preferred embodiment single wide beam arrays are suitably utilized to detect the presence or absence of a vehicle 22 in specific locations of the vehicle washing area 11. The use of entrance eye sensor 28, exit eye sensor 26, and clearance eye sensor 30 in the operation of the vehicle washing system are described in greater detail below during a discussion of the operation of vehicle washing system 10 for one wash option.

The present invention also preferably includes air hose switch 44, which detects entry of vehicle 22 into the vehicle washing area 1, and transmits air switch sensor signal 310 to control unit 300. While the preferred embodiment utilizes an air hose switch to detect the entrance of a vehicle into the vehicle washing area 11, the present invention is not to be construed as being so limited. Any sensor may be suitably utilized to detect the entrance of vehicle 22 into the vehicle washing area 11 including, but not limited to, air switches, photoelectric eyes, and magnetic detectors.

In the preferred embodiment of the present invention, undercarriage sensor 52 is also included. When an undercarriage wash cycle is included in a selected wash option, undercarriage sensor 52 preferably utilizes a photosensitive eye to detect the front of a vehicle 22 entering the vehicle washing area 11. Upon such detection, undercarriage sensor 52 suitably outputs undercarriage sensor signal 312 to control unit 300. Control unit 300 then preferably activates undercarriage wash mechanism 17 and washing of the undercarriage of vehicle 22 commences. Preferably undercarriage sensor 52 is positioned near the entrance end 58 of the vehicle washing system 10 such that undercarriage sensor 52 detects the front of vehicle 22 before any portion of vehicle 22 passes over undercarriage wash mechanism 17. Detections by undercarriage sensor 52 may occur before the front wheels of vehicle 22 activate air switch 44. Undercarriage sensor 52 also preferably stops transmitting undercarriage sensor signal 312 to control unit 300 immediately after detecting the end of vehicle 22, which normally occurs after the rear wheels of vehicle 22 depress air switch 44. Thus, undercarriage sensor 52 ensures an undercarriage wash (if selected) is applied to the entire undercarriage of vehicle 22 and not just those sections of vehicle 22 which are in-between the front and rear wheels.

Referring once again to the preferred embodiment of the present invention, vehicle washing system 10 also includes numerous sensors for tank temperatures and fluid levels. These sensors provide input signals to control unit 300, as represented in FIG. 3A, such as pre-soak tank temp sensor signals 332 and tank water level sensor signals 330. Control unit 300 suitably responds to these input signals, for example, by activating tank heaters when needed, opening valves to refill tanks to pre-set levels, and the like. Thus, control unit 300 preferably controls all of the features and functions of the vehicle washing system of the present invention in all climates and at all times of the day with no operator interface required.

The preferred embodiment of the present invention also includes treadle switch 42 which provides treadle switch sensor signal 308 to control unit 300 and indicates that vehicle 22 has progressed to the designated stopping point in the vehicle wash envelope 11. Preferably treadle switch 42 is positioned in the vehicle wash envelope 11 at an optimal distance from the end of track 49 and beginning of track 51 such that most vehicles may completely enter vehicle wash envelope 11. Treadle switch 42 also preferably provides a recess within which a vehicle's tire may reside (and thereby retain a vehicle) during the various wash cycles. Upon receipt of treadle switch sensor signal 308, control unit 300 initiates the wash cycles. Treadle switch 42 also preferably signals control unit 300 if and when vehicle 22 leaves treadle switch 42 before, after, or during any wash cycles, thereby allowing control unit 300 to terminate, if necessary, vehicle washing operations before damage occurs to either vehicle 22 or vehicle washing system 10.

Monitoring and control of the operation of the gantry 12 is preferably provided by a series of sensors, inverters, and the like. As shown in FIG. 6, travel limit entrance sensor 48, situated near the end 49 of track 20, transmits travel limit entrance sensor signal 314 (as shown in FIG. 3A) to control unit 300 whenever gantry 12 has traveled to the end 49 of track 20. Similarly, travel limit exit sensor 50, positioned near beginning 51 of track 20, transmits travel limit exit sensor signal 316 to control unit 300 whenever gantry 12 has traveled to beginning 51 of track 20. Control unit 300 upon receiving either travel limit signal 314 or 316 preferably commands gantry 12 to stop and thereby prevents damage to gantry 12 or vehicle 22. However, travel limit sensors 48 and 50 are preferably stop-gap measures which are utilized in the event of failure of other sensors and or measurements which are utilized by control unit 300 to control the movement of gantry 12 along track 20.

Control unit 300 also preferably monitors the real-time position of gantry 12 along the length of track 20. The position of gantry 12 is preferably reflected in a mathematical value stored in data register D320 (see FIG. 12). As gantry 12 moves along the length of track 20, gantry pulser 24 outputs to control unit 300 a gantry pulser signal 24 which preferably consists of a signal which increments or decrements the value in data register D320. In the preferred embodiment, gantry pulser 24 transmits decrement signals as gantry 12 moves towards the beginning 51 of track 20 (i.e., towards the exit 60) and increment signals as gantry 12 moves towards the end 49 of track 20 (i.e., towards the entrance 58). In the preferred embodiment, the position of gantry 12 on track 20 at the beginning 51 of track 20 is assigned a value of zero, this value is preferable stored in data register D321. Similarly, gantry position at the end 49 of track 20 is preferably periodically determined (while calibrating gantry pulser 24) and stored in data register D322. The value stored in D322 preferably represents the number of pulser counts necessary to move gantry 12 from beginning 51 to end 49 of track 20.

To determine the current location of gantry 12 at any moment along track 20, control unit 300 preferably compares the value in data register D320 against predetermined values stored in data registers which represent specific positions along track 20. The position of gantry 12 at any point along track 20 may be suitably calibrated and pre-set positions determined as necessary. While the present invention utilizes gantry pulser 24 in conjunction with a plurality of data registers 1200 to determine the position of gantry 12 on track 20, it is to be understood that any method of determining the position of gantry 12 within vehicle washing area 11 may be utilized in the present invention.

The present invention also monitors the speed of gantry 12 as it moves along the span of track 20. A gantry speed inverter is preferably included in the present invention which transmits gantry speed inverter signal 328 to control unit 300. Gantry speed inverter signal 328 preferably indicates the current speed of gantry 12. Gantry speed inverter also is preferably adjustable such that gantry 12 may be directed to travel at varying speeds as desired. While the present invention preferably utilizes a gantry speed inverter, it is to be understood that any means of determining and/or controlling the speed of gantry 12 may be utilized including calibrations based upon the rates of change of gantry pulser signals, time based measurements of distances traveled, and the like.

The positioning of side wands 14 (i.e., whether tilted, "deployed" or non-tilted, "stowed") is also suitably controlled by control unit 300. Whenever side wands 14 are stowed, a side boom safety switch preferably transmits a side boom safety switch signal 322 to control unit 300. Side boom safety switch signal 322 may be generated by any suitable sensor, including switches, potentiometers, or the like. In the preferred embodiment, side boom safety switch signal 322 is generated by a switch (not shown) positioned in each side wand 14. Since each side wand 14, if deployed when gantry 12 is along the side of vehicle 22, may come into contact with a side of vehicle 22, control unit 300 preferably verifies each side wand 14 is stowed before commanding gantry 12 to travel on rail 20 along the side of vehicle 22. In this manner, the present invention facilitates the efficient cleaning of the front and rear of vehicles by allowing side wands 14 to deploy when gantry 12 is positioned an optimal distance in front of and behind vehicle 22, while side wands 14 are safely stowed when gantry 12 travels along the length of vehicle 22.

Control unit 300 similarly monitors the position of top boom 16. In a preferred embodiment, two sensors are provided which monitor the position of top boom 16. One sensor, a top boom safety switch 32, preferably transmits a top boom safety switch signal 318 to control unit 300 whenever top boom 16 is raised to its highest, stowed, position above the ground (i.e., at or near the top of gantry 12). The other sensor is preferably a top boom pulser (not shown) which transmits a top boom pulser signal 320 to control unit 300. Top boom pulser signal 320 preferably increments as top boom 16 is lowered and decrements as top boom 16 is raised. Preferably each count of the top boom pulser signal equals one inch of vertical movement of top boom 16. In the preferred embodiment, top boom 16 is positioned via a pneumatic system. As the system heats up, variations in the rate at which the top boom 16 is raised/owered may occur. As such, control unit 300 preferably adjust the speed of gantry 12 to correspond with the speed at which top boom 16 is being raised/lowered. In this manner, the present invention ensures top boom 16 is at all times a preferred minimum distance from the surface of vehicle 22. Based upon a comparison of calibrated readings, control unit 300 utilizes top boom pulser signals 320 to determine the relative height of top boom 16 from the floor of the vehicle wash.

Figure 4:
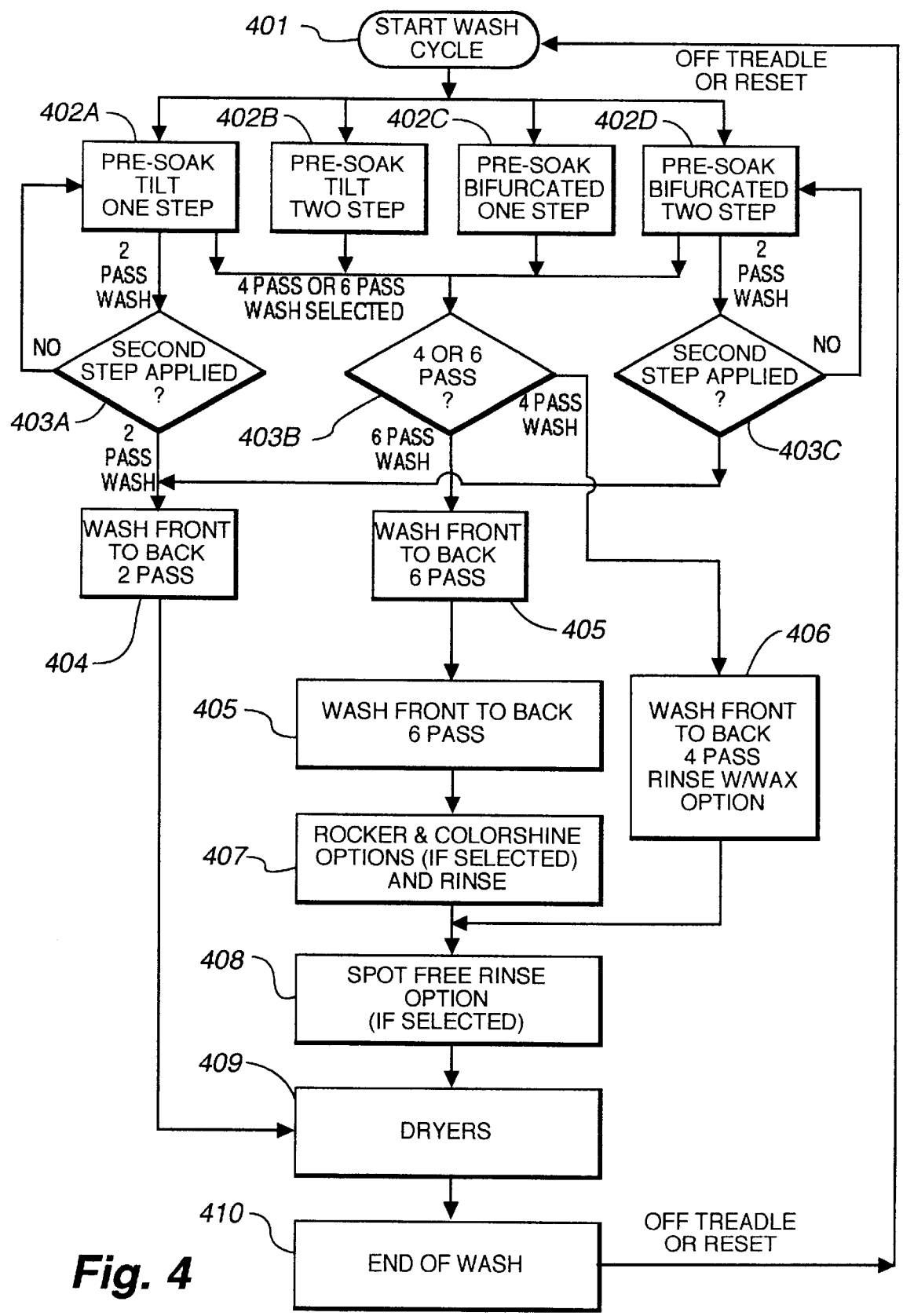
FIG. 4 is a flow chart showing an overview of the various wash options available for a preferred embodiment of the present invention.

Control unit 300 also preferably receives from car wash selection panel (not shown) car wash select signals 326. Car wash select signals 326 preferably indicate to control unit 300 which of the various vehicle wash option packages the current customer has selected. These wash option packages are preferably programmable such that vehicle wash station operators may devise wash option packages which meet the needs of their customers. For example, as shown in FIG. 4, a station operator may provide packages which include various combinations of the following features: tilting or bifurcated pre-soak washes (Blocks 402A–C), 2, 4, or 6 pass washes (Blocks 403A–C), rocker panel or color shine (Block 407), wax (Block 406), spot free rinse (Block 408), and drying options (Block 409). Each of these wash options is suitably stored in control unit 300 by activating or deactivating appropriate program relays 1216 (FIG. 12). When a customer purchases a wash option, preferably a selection is made from the various preprogrammed packages. At this point, program relays 1216 are suitably loaded by CPU 1212 into run latches 1202 for execution by CPU 1212 during the vehicle wash cycles. However, the present invention is not to be construed as being limited to allowing a customer to only select pre-programmed wash option packages. The present invention may be suitably modified such that specific wash options may be selected by the customer as desired.

Control unit 300 preferably controls the operation of the vehicle washing system 10 via a plurality of output signals. As shown in FIG. 3B, control unit 300 generates wash status display signals 334 which preferably designate on a display the various wash options currently being provided by vehicle washing system. Status display signals 334 are generated based upon the current setting of the various display control relays M0–M3 (FIG. 12). Preferably, such relays combine to form hexadecimal words which may control the on/off status of up to sixteen display signs. However, the present invention may be suitably modified by adding or subtracting relays, as necessary, to accommodate any number of display and/or message signs.

Control unit 300 also provides gantry drive direction signals 336 and gantry speed control signals 350 which control the operation of motors which drive gantry 12. Top boom control signals 338 are generated by control unit 300 to control motors which raise, lower, and/or tilt top boom 16.

Side boom control signals 342 are generated by control unit 300 to control motors which deploy and/or stow side wands 14. Signals are also generated by control unit 300 which control the various valves connecting front nozzles 34, rear nozzles 36, tanks, lines, and such. For example, main tank fill signal 346 opens valves which allow water to fill the main tank. Similarly, pumps, actuators, and the like of the present invention are preferably controlled via signals generated by control unit 300 (for example, pre-soak pump signals 340).

The security and environmental features of the present invention are also preferably controlled by control unit 300. For example, door control signals 348 designate when entry and exit doors restricting access to the vehicle washing area 11 are opened/closed. Other control signals generated by control unit 300 determine whether resources are recycled (for example, program relay M525 (FIG. 12) specifies for wash option number one whether excess waxes sprayed towards vehicle 22 are recycled). Other control signals, data registers, latches, and/or relays determine drying times, detect operating errors in vehicle washing system 10, and the like. In short, control unit 300 suitably controls all facets and operations of vehicle washing system 10.

However, the various devices and components utilized by vehicle washing system 10 may be operated and/or controlled by any suitable combination of manual, semi-automatic, and automatic systems, including systems which are not directly or indirectly controlled by control unit 300. For example, tank temperatures may be suitably controlled by thermostats, and door openings/closings may be suitably controlled by air switches or the like without any input from control unit 300. Thus, the present invention is not to be construed as being limited to a vehicle washing system entirely controlled by a centralized control unit, any combination of automatic and/or controlled operations is to be considered as being within the scope of the present invention.

As previously mentioned, FIG. 4 illustrates the various washing options and features preferably provided by the present invention. Each of these features is preferably combined into groups of four or more wash options by an owner/operator of each vehicle washing system 10. However, any wash option or combination of wash options may be suitably accommodated by the present invention. For example, a first wash plan may consist of a pre-wash, wash, and rinse without any undercarriage, rocker-panel, wax, or the like, while a second wash plan may consist of all the options (i.e., "the works "). Since each wash plan is preferably stored in program relays 1216 (see FIG. 12), the present invention preferably allows operators of vehicle washing system 10 to modify wash plans as particular needs dictate (for example, undercarriage washes are not desired in Arizona as much as they are in a high road salt environment, such as the Northeast).

For purposes of illustrating the operation of the unique features of the present invention only, this discussion assumes that a customer selects wash option number one which includes the following features: undercarriage wash, a pre-soak with two tilts, a 6 pass wash, rocker panel wash, color shine wash, spot free rinse, and deluxe drying. Thus, in FIG. 4, the following blocks would be implemented: 401, 402B, 403B, 405, 407, 408, 409, and 410. In FIG. 12, the following program relays 1216 would preferably be set by a station operator when configuring the vehicle washing system 10: M513—undercarriage wash; M517—front pre-soak with two tilts; M518—rear pre-soak with two tilts; M512—six pass wash; M516—rocker panel wash; M519—color shine wash; M515—spot free rinse; and M522—deluxe drying.

Figure 5A:
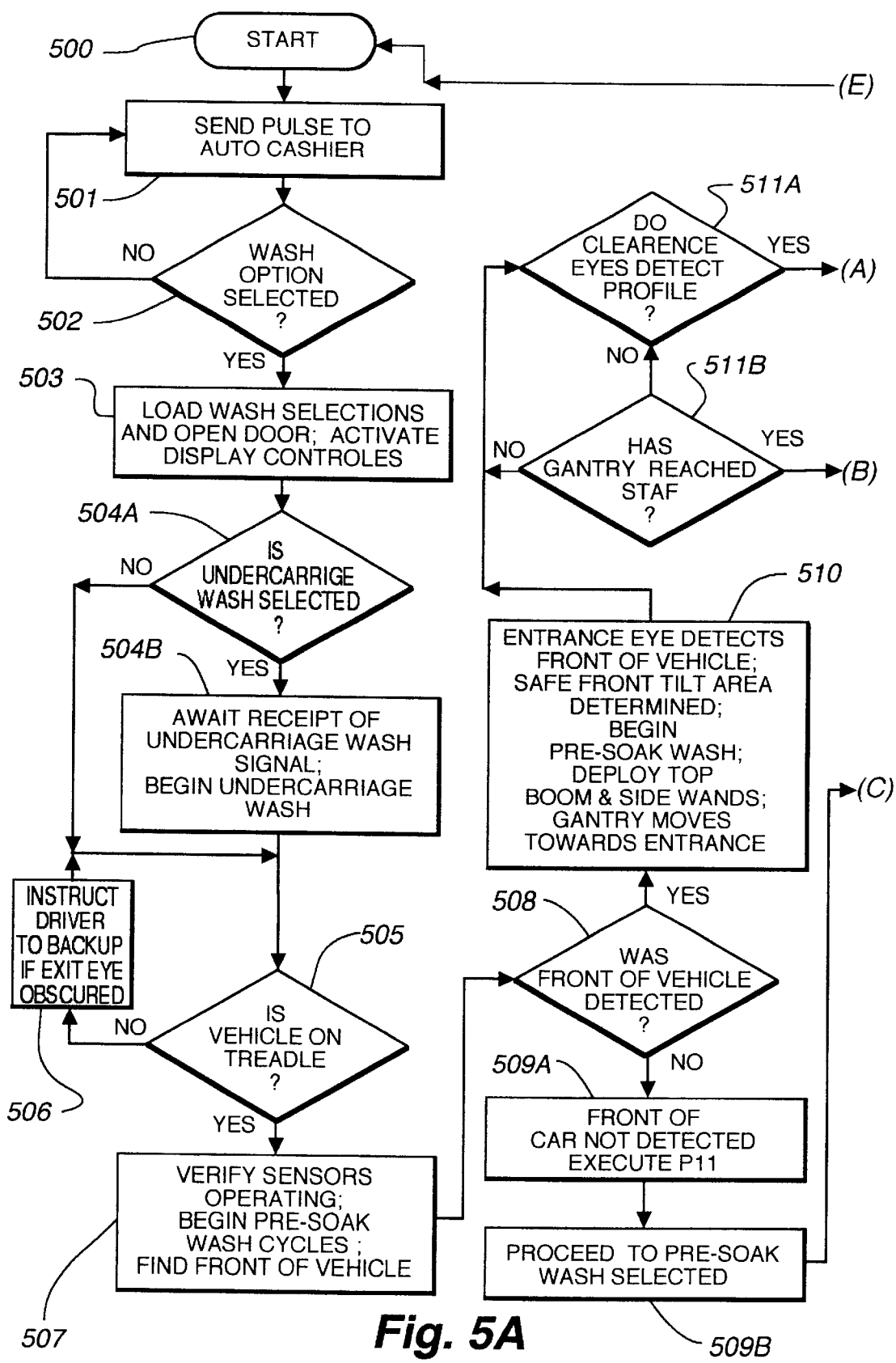
FIGS. 5A–5C is a flow chart illustrating one control path implemented by the control unit for a preferred embodiment of the present invention.
Figure 5B:
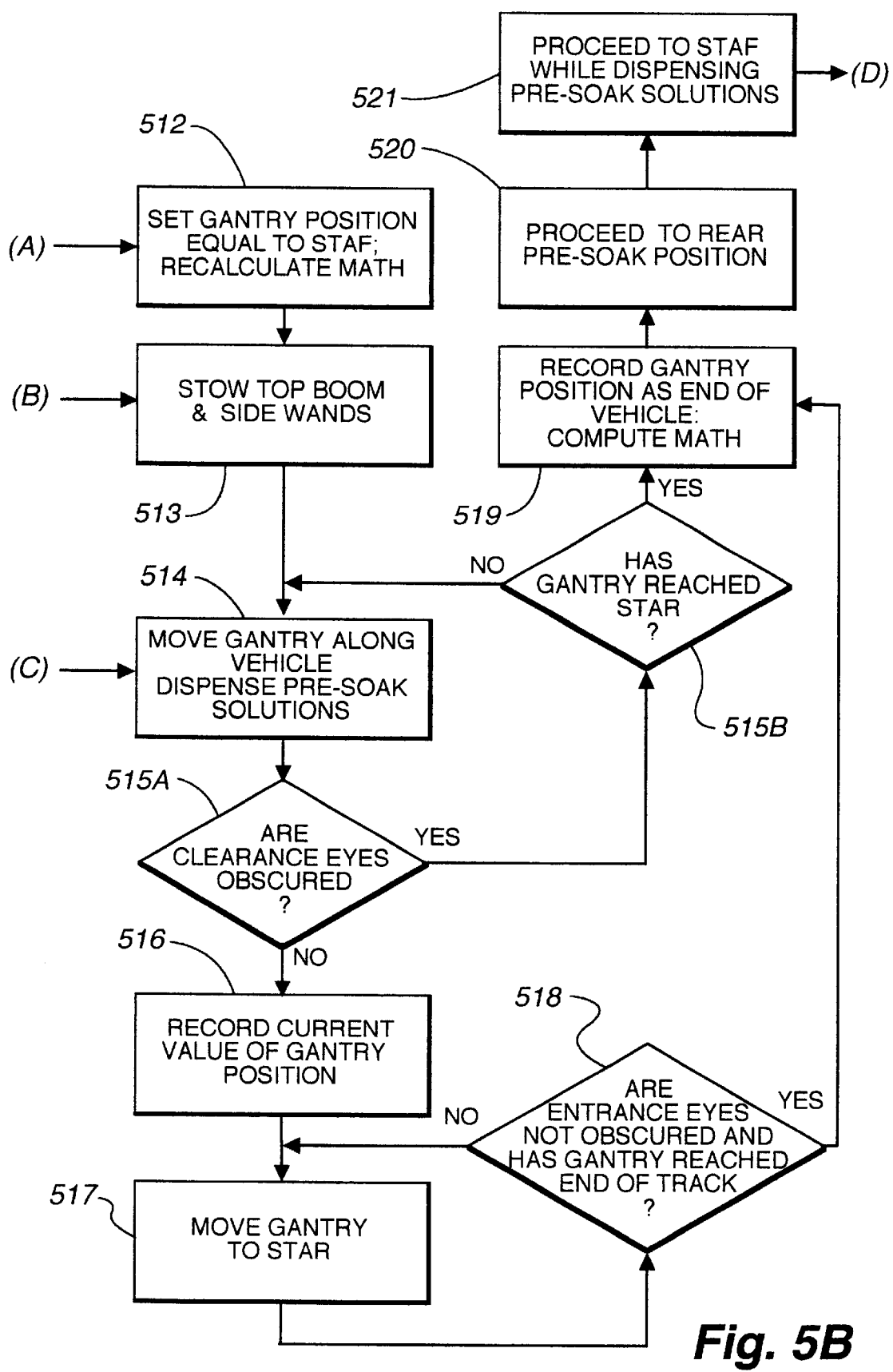
Figure 5C:
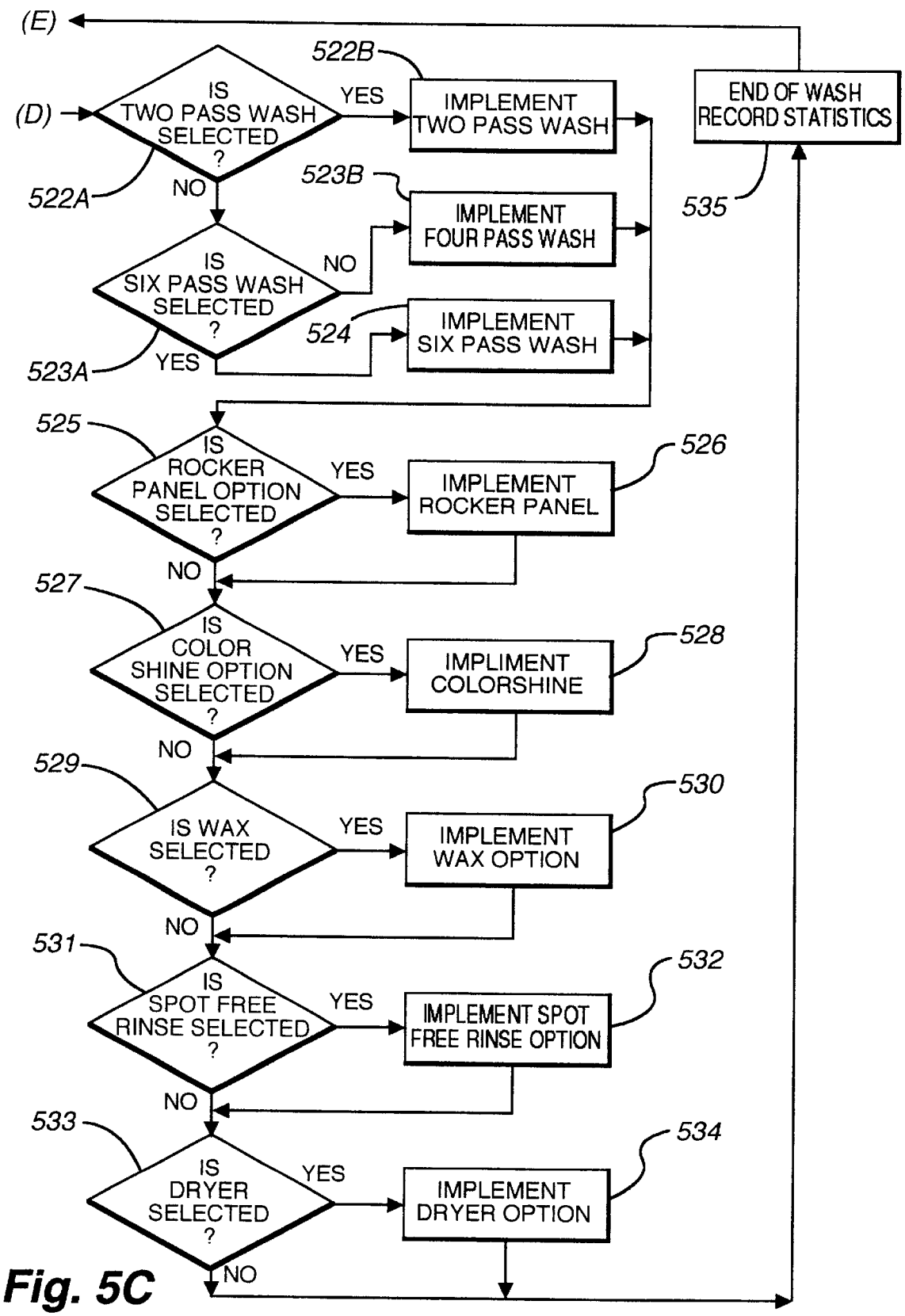

Referring now to FIG. 5, Block 501, in implementing a vehicle washing sequence as identified above, the sequence preferably begins when control unit 300 sends to a coin box (a car wash selection panel) a pulse indicating that control unit 300 and vehicle washing system 10 are ready for the next vehicle 22. While this description of the operation of the vehicle washing system 10 is herein described in the context of sequential operations, it is to be understood that the present invention is not so limited. Sequential and/or parallel operations are suitably accommodated, as necessary, by the present invention.

Referencing Block 502, while waiting for a customer to select a car wash option and/or enter a pass code indicating the customer is ready to proceed with a wash, control unit 300 preferably loads a run monitor (i.e., a watchdog timer) which monitors and resets the control unit 300 in the event of hardware and/or software errors, including the expiration of pre-set time periods, system malfunctions, and the like. Additionally, various registers utilized by control unit 300 for a previous wash are reset. For example, data registers related to a previous wash sequence are preferably reset. Variables, including time intervals, utilized by control unit 300 during a vehicle wash sequence are also suitably loaded into data registers 1200.

Control unit 300 continues to poll the coin box until it receives a wash select signal 326 from the coin box. The coin box transmits wash select signals 326 (see FIG. 3A) upon entry by a customer of the appropriate authorization code, the payment of the current amount, or the like. Wash select signal 326 identifies to control unit 300 which wash option was selected by the customer and is to be performed. Preferably this designation is accomplished by a selection of wash option one, two, three, or four.

While the present invention utilizes an coin box or similar data entry and payment verification system, the present invention is not limited to the operation or use of the coin box or the like. As such, any system which facilitates the selection of wash options, provides an output signal indicative of such wash options, and identifies when a customer is ready to receive such wash options is to be considered as being included within the present invention.

Referencing Block 503, upon receipt of wash select signals 328, control unit 300 preferably recalls from program relays 1216 the various options which are preprogrammed for a specific wash option. These options (i.e., relay settings) are suitably moved into corresponding run latches 1202 which are used thereafter by CPU 1212 to determine which wash options are selected. By using latches to store current wash options, the present invention increases the speed and efficiency of control unit 300 processing inputs and generating outputs by limiting the amount of time necessary for CPU 1212 to locate and determine wash options. In this scenario, for example, the undercarriage wash option is selected, thus control unit 300 recalls the setting of the undercarriage wash relay M513 (FIG. 12) and configures undercarriage wash latch M203 based upon the configuration of M513.

Additionally, control unit 300 verifies gantry 12 is positioned at the beginning 51 of track 20 and continually monitors the various sensors, components, and features of the present invention for system and/or operating errors or malfunctions. Should gantry 12 not be positioned at beginning 51 of track 20, control unit 300 attempts to move gantry 12 to the beginning 51 of track 20. If unsuccessful, appropriate error relays are set and vehicles washing operations do not proceed.

Once gantry 12 is at the exit end, control unit 300 preferably determines whether the entrance door (if any) is open or closed. If closed, control unit 300 suitably outputs door control signal 348 to the door opening mechanism which opens the door. Control unit 300 also preferably outputs wash status display signals 334 which appropriately illuminate display signs which direct vehicle 22 into the vehicle wash envelope 11 and indicate the various wash features which have been selected. Similarly, throughout the course of washing vehicle 22, control unit 300 preferably outputs wash status display signals 334 which indicate the status, number of wash cycles remaining, provide directions to a driver of vehicle 22, and the like. Control unit 300 also outputs control signals which turn on pre-soak heaters, open valves for the undercarriage wash 17 mechanism (when the option is selected), initialize drier configurations, and the like. The use of output signals from control unit 300 or the like to control display signs, heaters, valves, and the like is commonly known in the art. As such, the present invention suitably uses known systems to control display signs, valves, and the like, and any system currently known or hereafter discovered which is used to control such devices is considered to be within the scope of the present invention. Referencing Block 504A, if the undercarriage wash option is selected, control unit 300 preferably awaits detection of a vehicle by undercarriage sensor 52.

Referencing Block 504B, for a preferred embodiment, as vehicle 22 enters the vehicle washing area 11, the front of vehicle 22 is preferably detected by undercarriage sensor 52. Undercarriage sensor 52 suitably transmits undercarriage sensor signal 312 to control unit 300. Upon receipt of undercarriage sensor signal 312, control unit 300 suitably activates the undercarriage washing mechanism 17, which begin to spray cleaning solutions onto the undercarriage of vehicle 22. The undercarriage wash continues until either a timer associated with the undercarriage wash times out, undercarriage sensor 52 is no longer obscured (and transmission of undercarriage sensor signal 312 to control unit 300 ceases), or the front tires of vehicle 22 depress treadle switch 42, whichever occurs first. After undercarriage wash cycle is completed, control unit 300 preferably opens valves which suitably drain lines of solutions utilized during undercarriage wash cycle.

Additionally, since the front tire of long vehicles (for example, pick-up trucks) may depress treadle switch 42 while undercarriage sensor 52 is still obscured, control unit 300 preferably examines whether a second air switch sensor signal 310 has been transmitted by air switch 44 indicating the rear tires of vehicle 22 have entered the vehicle washing area.

Additionally, since the present invention is primarily controlled by control unit 300, it is to be understood that the operation of vehicle washing system 10 may be suitably modified as specific needs dictate without departing from the spirit or scope of the present invention. For example, a vehicle wash operator may suitably program control unit 300 such that an undercarriage wash cycle lasts for only a predetermined time interval, whereas another operator may desire the undercarriage wash cycle to last until the front tires reach treadle switch 42. The present invention suitably accommodates such variations in operation and features.

As vehicle 22 enters the vehicle washing area 11, the control unit 300 preferably prepares various washing components for upcoming use. Control unit 300 suitably analyzes pre-soak tank temperature sensor signal 332 in determining whether to activate heaters in the pre-soak tank.

Referencing Block 505, when vehicle 22 reaches treadle switch 42, control unit 300 preferably queries exit eye sensor 26 to verify it is not obscured. If vehicle 22 is depressing treadle switch 42 while exit eye sensor 26 is obscured, vehicle 22 has probably driven too far into the vehicle washing area 11, and the rear tires (instead of the front tires) of vehicle 22 are probably depressing treadle switch 42.

Referencing Block 506, in such instances, control unit 300 suitably activates display signs and/or sounds horns which instruct the driver to back up. Control unit 300 also terminates vehicle washing cycles and initiates a timer. If the timer expires before vehicle 22 backs up and the exit eye sensors 26 becomes non-obscured, control unit 300 generates an error signal, terminates the wash, opens the exit door, and instructs the driver to exit the vehicle washing area 11.

Referencing Block 507, once the front wheel of vehicle 22 is depressing treadle switch 42, control unit 300 advances through the wash cycle program by verifying entrance eye sensor 28 and clearance eye sensor 30 are properly functioning. Control unit 300 also preferably initiates a timer which provides the maximum time allowed for gantry 12 to travel from the beginning 51 to the end 49 of track 20. This timer is preferably utilized to prevent gantry 12 from traveling to the end 49 of track 20 if entrance eye sensor 28 fails to detect the front of the vehicle 22. Control unit 300 also preferably analyzes pre-soak tank temperature sensor signal 332 to ensure the temperature in the pre-soak tank is within limits. Control unit 300 also outputs wash status display signals 334 which indicate to a driver that the vehicle washing system 10 is implementing the pre-soak wash cycle and opens appropriate valves and activates pre-soak pumps. At this point, the gantry 12 position relative to the vehicle 22 is preferably as shown in FIGS. 7 or 13 with all sensors (26, 28, and 30) non-obscured. In FIGS. 7–11 the operation of the present invention is depicted in the context of a stocky vehicle. In FIGS. 13–17 the operation of the present invention is depicted in the context of a slim vehicle. As such, the vehicle washing area 11 for the present invention preferably accommodates a wide variety of vehicles, while making appropriate adjustments to operating procedures, as necessary, based upon the length and height profile of each vehicle 22.

Next, control unit 300 preferably begins outputting gantry drive direction signals 336 and gantry speed control signals 350 to drive motors (not shown) suitably situated on gantry 12. Control unit 300 also initiates a timer (the "find front of car timer"), preferably set at 5 seconds. As gantry 12 travels towards the end 49 of track 20, gantry pulser 24 preferably sends gantry pulser signals 324 to the control unit 300. The control unit 300 receives gantry pulser signals 324 and periodically increments data register D320 (see FIG. 12), which represents the current position of the gantry 12 on the track 20.

Figure 8A:
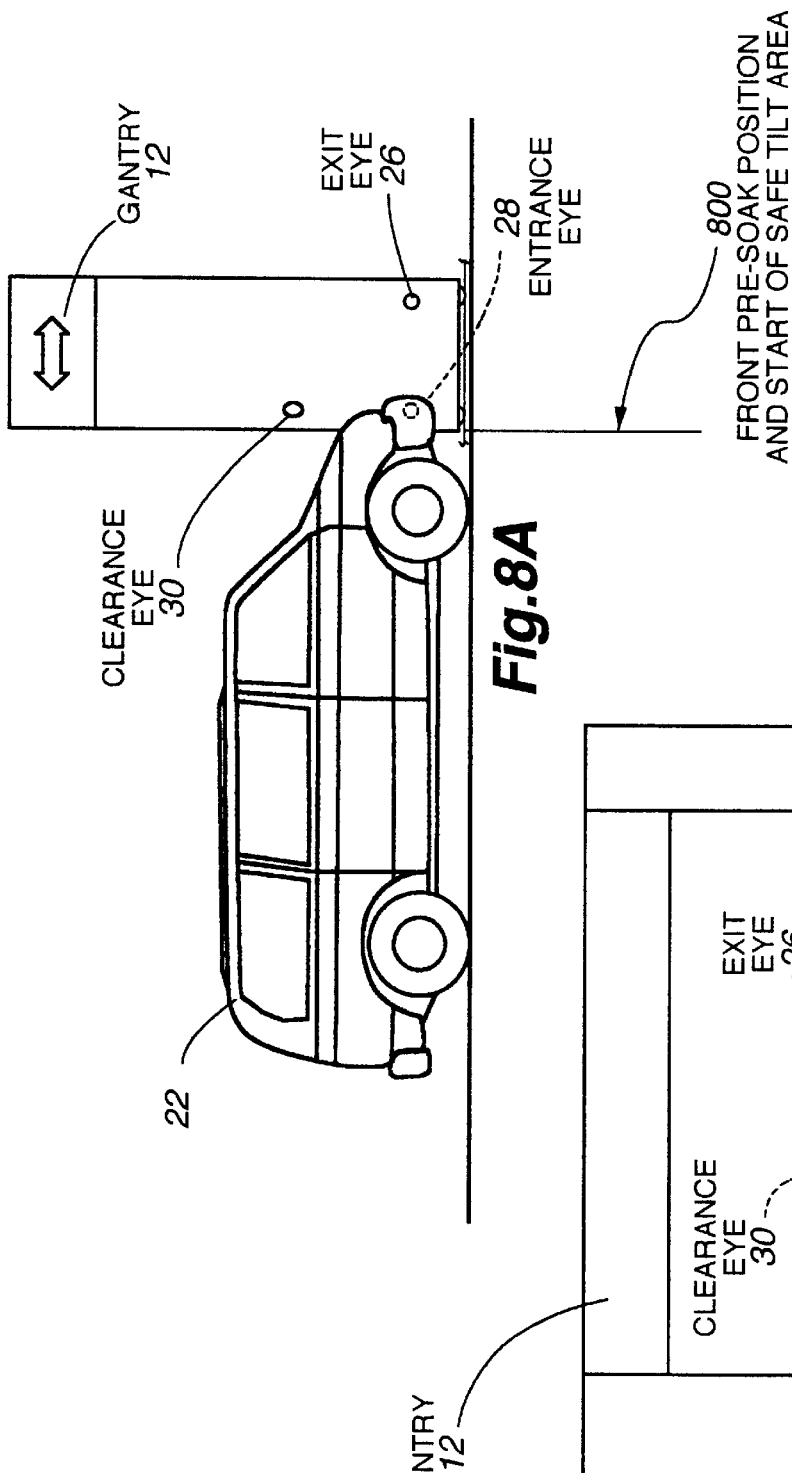
FIGS. 8A–8B is an illustration of the vehicle sensing features of a preferred embodiment of the present invention wherein the gantry has moved a sufficient distance towards the entrance of the vehicle wash such that the entrance eye has detected the front of a stocky profile vehicle.
Figure 8B:
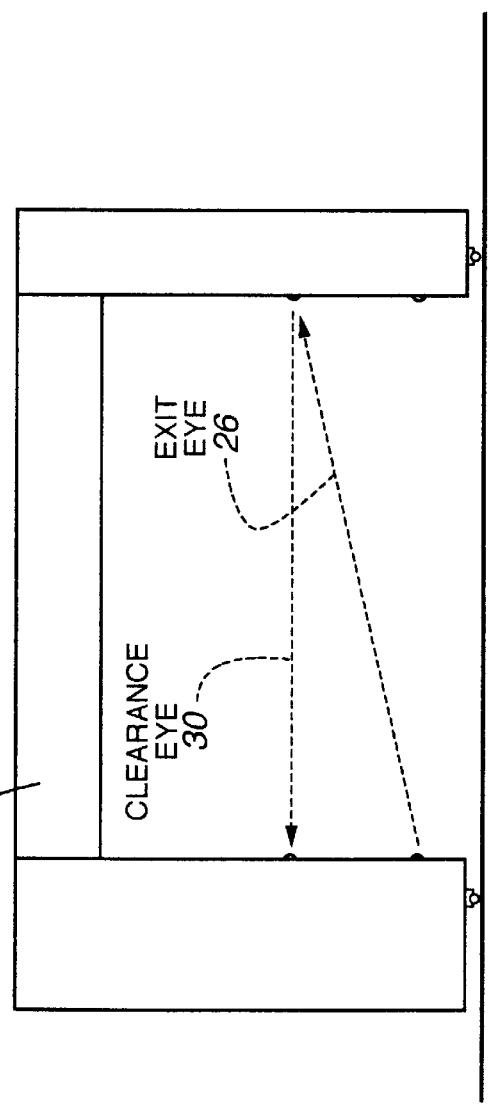
Figure 14A:
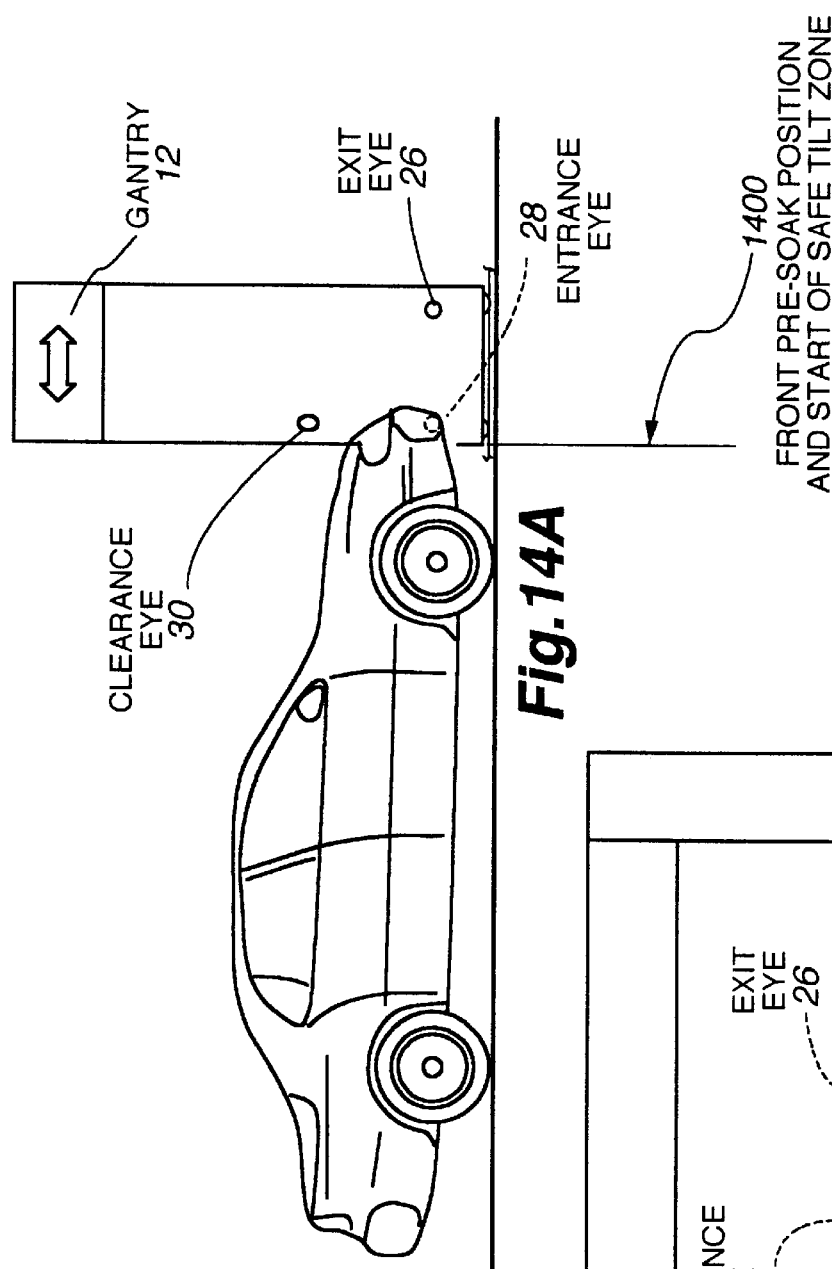
FIGS. 14A–14B is an illustration of the vehicle sensing features of a preferred embodiment of the present invention wherein the gantry has moved a sufficient distance towards the entrance of the vehicle wash such that the entrance eye has detected the front of a slim profile vehicle.
Figure 14B:
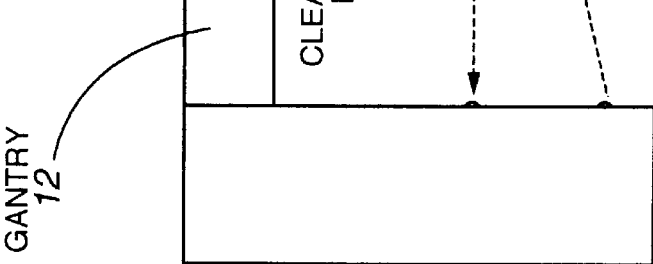
Figures 16A, 16B:
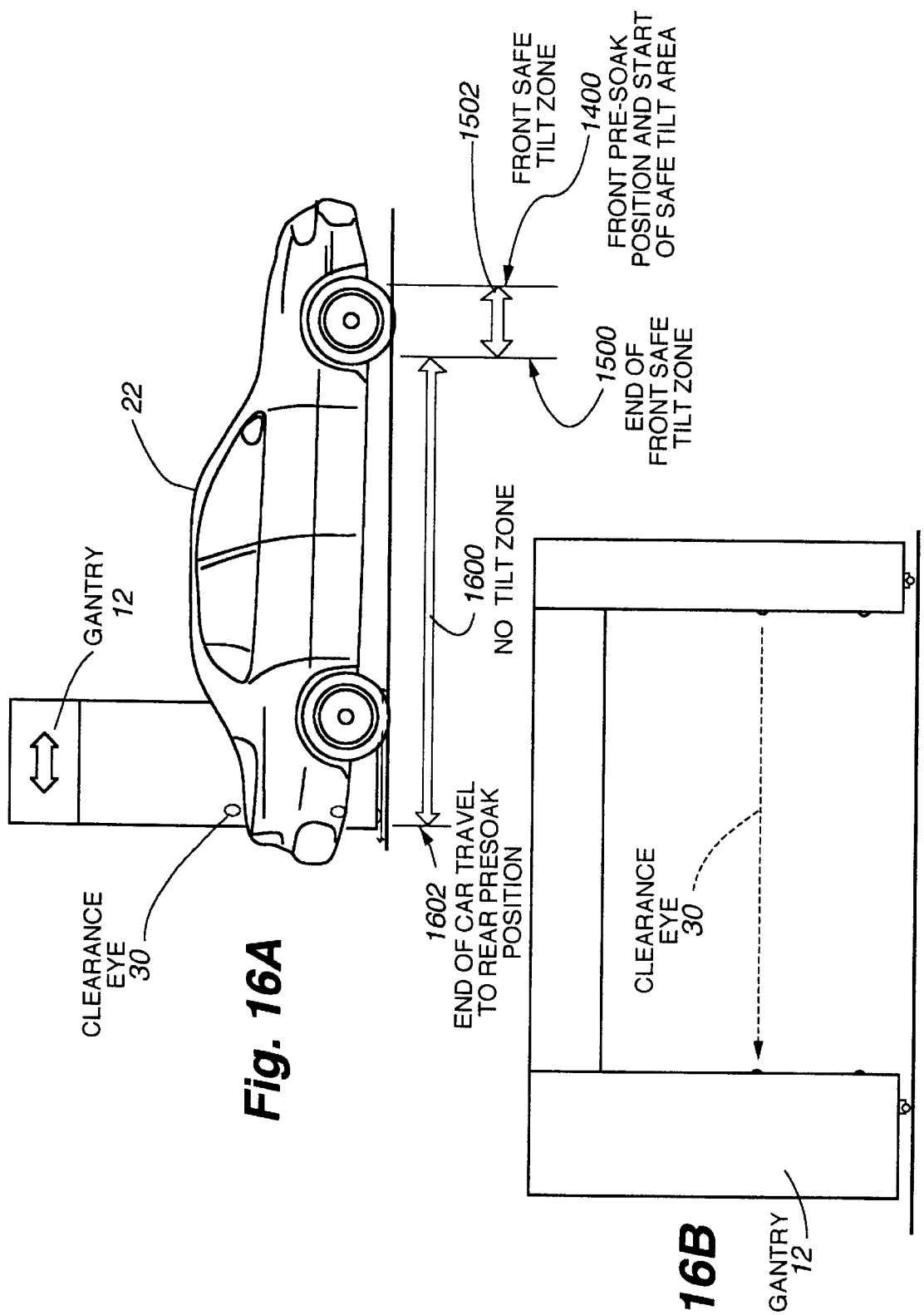
FIGS. 16A–16B is an illustration of the vehicle sensing features of a preferred embodiment of the present invention wherein the gantry is positioned along the side of a slim profile vehicle.

Referencing Block 508, as gantry 12 continues to travel toward the entrance end 58, and when entrance side 54 of gantry 12 is substantially parallel with the front end of vehicle 12, the entrance eye sensor 28 preferably detects the front of the vehicle 22 (as depicted in FIGS. 8 and 14 wherein entrance eye sensor 28 is obscured by the front of the vehicle 22).

Referencing Block 509A, in the event the entrance eye sensor 28 is malfunctioning and the front end of vehicle 22 is not detected, the "find front of car timer" previously set (see Block 507) times out and control unit 300 preferably executes a jump in its processing to routine P11, the eye sensor or pulser failure routine. Similarly, if gantry pulser 24 is malfunctioning, control unit 300 executes a jump to routine P11.

When executing routine P11, control unit 300 preferably sets default positions such as the beginning 51 of track 20 and the end 49 of track 20 as the positions at which specific wash events will begin. Control unit 300 preferably sets such positions at the respective ends of track 20 to ensure a safe operating distance is maintained between the vehicle 22 and the deployed washing component (top boom 16 and side wands 14). Control unit 300 sets these default positions by moving the value in data register D321 (i.e., the value for beginning 51 of track 20) into the following registers:

D326 (front safe tilt area);

D328 (front pre-soak position);

D330 (front high pressure position);

D332 (front rocker panel position);

D334 (front color shine position);

D336 (front dryer position for top blower);

D337 (middle dryer position for top blower); and

D339 (front dryer position for side blower).

Control unit 300 also moves the values in data register D322 (i.e., the value for the end 49 of the track 20) into the following registers:

D324 (end of vehicle 22);

D325 (length of vehicle 22);

D327 (safe rear tilt area);

D329 (rear pre-soak position);

D331 (rear high pressure position);

D333 (rear rocker panel position);

D335 (rear color shine position);

D338 (rear dryer position top blower); and

D340 (rear dryer position side blower).

The above data register values are suitably utilized by control unit 300 to determine where to position gantry 12 along track 20 for the various wash cycles when eye sensors and/or gantry pulser 24 are malfunctioning. While the present operation is described in the context of jumps in program steps, moving data values, and the like it is to be understood that the present invention is not limited to any particular code, software, hardware, operating system, or the like.

Referencing Block 509B, control unit 300 next queries run latches M210 (which indicates whether a one step or two step pre-soak wash is to be performed) and M616 (which indicates whether a bifurcated pre-soak wash is to be performed). Based upon the settings of latches M210 and M616, control unit 300 proceeds to the appropriate pre-soak wash. However, since entrance eye sensor 28 and/or gantry pulser 24 are malfunctioning, control unit 300 does not jump to the beginning of pre-soak wash routines or perform the front tilts and/or deploy top boom 16 which are normally performed in an error free wash. Instead, control unit 300 jumps into pre-soak wash routines at a point which is after all front tilts and/or top boom 16 deployments but before gantry 12 is directed to move towards end 49. Control unit 300 skips all front pre-soak tilts and starts to providing gantry drive direction signals 336 to motors which move gantry 12 on track 20 along the length of vehicle 22 towards end 49 while spraying the selected pre-soak solution onto the vehicle 22.

Referencing Block 510, when the entrance eye sensors (28) and the gantry pulser 24 are functioning normally, entrance eye sensor 28 suitably detects the front of the vehicle 22 and preferably transmits entrance eye sensor signal 302 to the control unit 300. Control unit 300 suitably terminates movement of the gantry 12 along the track 20 and preferably records the current value of data register D320 (i.e., the current position of gantry 12 on track 20) in data register D323 (i.e., the position of the beginning of vehicle 22 relative to track 20). Control unit 300 queries run latches M210 (which indicates whether a one step or two step pre-soak wash is to be performed) and M616 (which indicates whether a bifurcated pre-soak wash is to be performed). Based upon the settings of latches M210 and M616, control unit 300 proceeds to the beginning of the selected pre-soak wash. For purposes of illustration only, a two-step non-bifurcated wash is described herein, however, it is to be understood that bifurcated pre-soaks, one-step pre-soaks, and the like are suitably accomplished by the present invention.

At this point, control unit 300 suitably calculates settings for a front safe non-tilt area which is preferably two (2) inches closer to the front of the vehicle than detected by the entrance eye sensor 28 (as reflected in data register D323) by adding D323 to a constant and storing the result in data register D343 (Safe Tilt Area Front (STAF)+2). The constant is suitably calibrated such that a specific number of pulser counts equals two (2) inches. Control unit 300 similarly determines a rear safe non-tilt area by setting D322 (end of track) equal to D342 (Safe Tilt Area Rear (STAR)−2).

Next, control unit 300 suitably opens pre-soak valves which allow a low pH solution to be sprayed onto vehicle 22 via front nozzles 34, rear nozzles 36, side wands 14, and the top boom 16. Control unit 300 preferably activates only those nozzles which will spray solutions directly onto vehicle 22 and not into other areas of the vehicle washing area 11 where the vehicle 20 is not present. Thus, at this instant in the present example, the control unit 300 suitably opens front nozzles 34 (since they are substantially parallel with the front of vehicle 20, while not opening rear nozzles 36 until the gantry 12 has traveled along the length of vehicle to a point such that rear nozzles spray solutions directly onto vehicle 20). Additionally, while the present invention is described in the context of a two step pre-soak wash in which a low pH solution is followed by a second and/or higher pH solution, it is to be understood that the present invention is not so limited. Any pre-soak solution or series of solutions may be suitably utilized by the present invention without departing from the spirit or scope of the present invention.

Control unit 300 also outputs top boom control signals 338 which activate actuators which deploy top boom 16. Control unit 300 preferably pauses for a preset time period, and implements a tilt of both side wands 14 and top boom 16 (after it has no deployed). In the event the tilting and/or top boom 16 operations malfunction, control unit 300 suitably waits for such error conditions to clear or after a pre-set time period automatically advances to next program step.

Next, control unit 300 adds 28 inches to D323 (beginning of car) and stores the result in D326 (STAF). STAF preferably identifies the furthest point towards end 49 that the gantry 12 is allowed to travel when the top boom 16 is deployed and/or tilting occurs.

Control unit 300 also verifies clearance eye sensor 30 is correctly operating and outputs gantry drive direction signals 336 and gantry speed control signals 350 which result in gantry 12 moving toward the end 49 while seeking STAF (i.e., the value in D326). Preferably the speed of the gantry 12 is set at a slow rate of speed since the top boom 16 is deployed.

Referencing Block 511A, as gantry 12 travels toward the end 49 (with washing apparatus suitably spraying pre-soak solutions directly onto the front and sides of the vehicle 22)

the control unit 300 monitors clearance eye sensor 30 until it's "beam" is interrupted by a portion of vehicle 22 (as shown in FIG. 9).

Referencing Block 511B, if clearance eye sensor 30 does not detect vehicle 22 (as shown in FIG. 15), gantry 12 preferably stops moving after reaching STAF. For most vehicles, the clearance eye sensor 30 is preferably first interrupted by a windshield after it travels over the hood of a vehicle. However, for high profile vehicles such as minivans, pick-up trucks, and the like, the clearance eye sensor 30 may be immediately interrupted. For low profile vehicles, such as sports cars, the clearance eye sensor may not be interrupted before gantry 12 reaches STAF.

Referencing Block 512, when clearance eye sensor 30 is interrupted (FIG. 9), control unit 300 stops movement of gantry 12 and moves D320 (the current position of the gantry) to D326 (STAF). Control unit 300 also recalculates D343 (STAF+2) by adding two (2) inches to D326.

Referencing Block 513, control unit 300 also directs side wands 14 and/or top boom 16 to return to stowed positions, as necessary. In an alternative embodiment, multiple tips of side wands 14 and/or deployments of top boom 16 may be provided. Thereby, providing a longer and more effective washing of the front surfaces of vehicle 22.

Figures 10A, 10B:
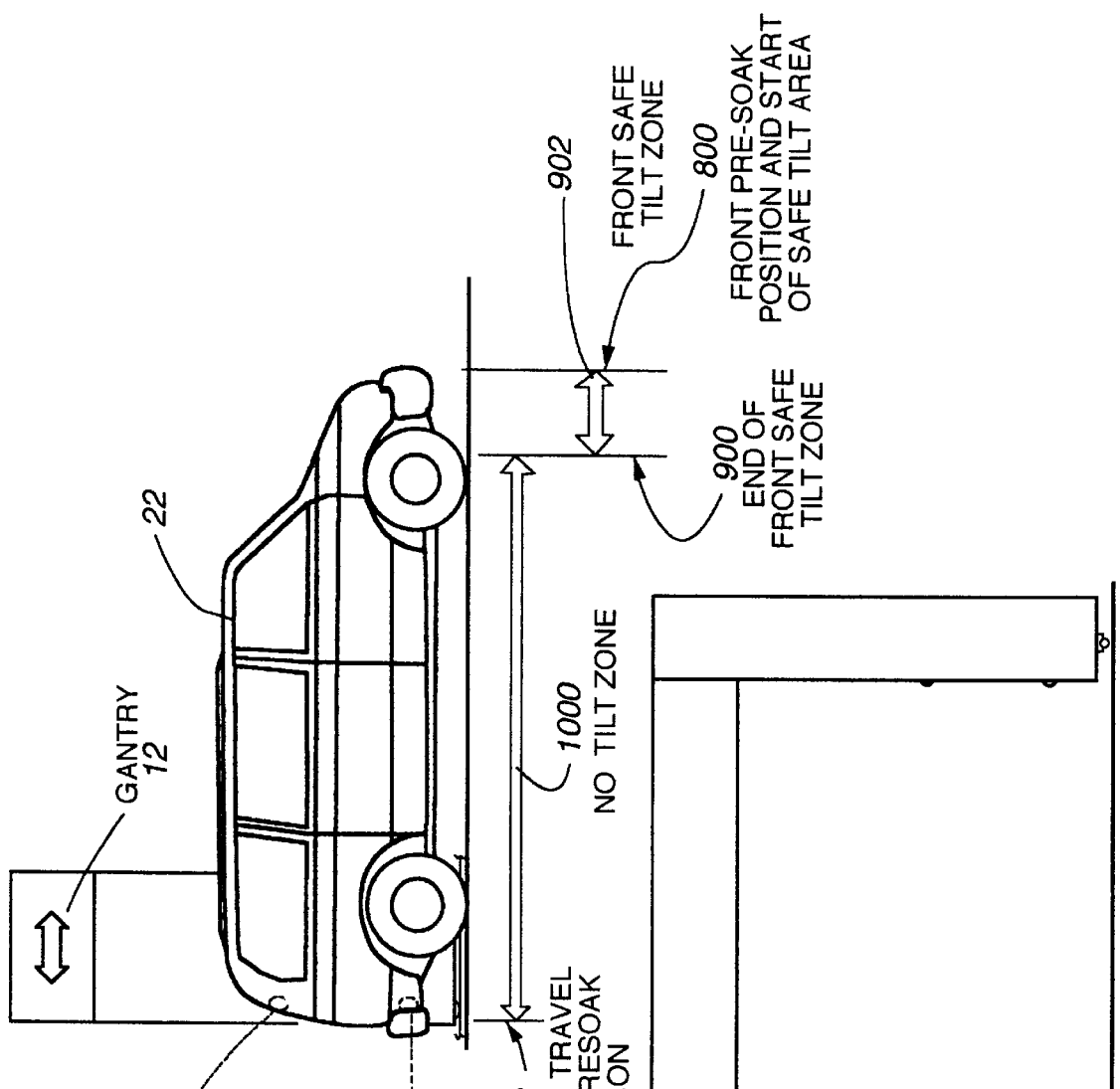
FIGS. 10A–10B is an illustration of the vehicle sensing features of a preferred embodiment of the present invention wherein the gantry is positioned along the side of a stocky profile vehicle.

Referencing Block 514, once the top boom 16 is stowed, the control unit 300 preferably receives the top boom safety switch signal 318 from the top boom safety switch. At this point, the control unit 300 directs gantry 12 to travel along the length of vehicle 22 towards the STAR (D327) which was previously loaded with the value stored in D322 (end of track) while continuing to spray pre-soak solutions onto vehicle 22 (FIG. 10).

Gantry 12 continues to travel along track 20 until it reaches STAR (FIG. 11). During the travel of gantry 12 to STAR, control unit 300 may suitably designate the speed of travel. In the preferred embodiment, the control unit 300 selects an optimal speed of 75 Hz, which equates to an approximate speed of one (1) feet/second. The present invention may be suitably designed such that the gantry 12 may travel at various speeds. However, slower gantry speeds generally equate to fewer vehicles washed per hour while higher gantry speeds decrease the cleaning effectiveness of a single pass of the vehicle washing system 10. In the preferred embodiment, control unit 300 preferably specifies the direction of gantry travel by loading D350 (seek) with specific positions along the track 20, for example, STAR.

Referencing Block 515, during travel of the gantry 12 toward the entrance end 58 of track 20, control unit 300 monitors clearance eyes sensor signal 306 for whether clearance eyes sensor 30 is obscured.

Referencing Block 516, when clearance eyes sensor 30 is non-obscured, control unit 300 suitably records the current position of gantry 12 as the safe rear tilt position in D353.

Referencing Block 517, meanwhile, control unit 300 continues to command gantry 12 toward end 49.

Referencing Block 518, when entrance eyes sensor 28 becomes non-obscured or STAR is reached, control unit 300 performs the following operations:

(1) Moves the current value of D320 (gantry position on track 20) to D324 (end of vehicle);
(2) Adds a constant to D324 and stores the result in D327 (STAR), where the constant preferably represents half the width of the gantry such that during tilts, washing apparatus remain a safe distance from vehicle 22;
(3) Subtracts a constant (representative of two (2) inches) from STAR and stores result in D342 (STAR-2);
(4) Sets the front pre-soak position (D328) equal to D323 (beginning of vehicle);
(5) Sets the rear pre-soak position (D329) equal to D324 (end of vehicle);
(6) Sets the front high pressure position D330 a pre-set distance towards exit end 60 from D323 (beginning of vehicle);
(7) Sets the rear high pressure position D331 a pre-set distance towards entrance end from D324 (end of vehicle);
(8) Adds pre-set distances to D323 (beginning of vehicle) to set the front rocker panel position D332 and front color shine position D334;
(9) Adds pre-set distances to D324 (end of vehicle) to set the rear rocker panel position D333 and rear color shine positions D335; and
(10) Determines the various dryer positions (D336–D340).

Next, the control unit 300 preferably determines whether the vehicle 20 is too long for vehicle washing system 10 to implement a rear tilt by comparing D327 (STAR) with D322 (end of track). If D327 is within forty (40) counts of D322 then the control relay M143 is suitably set and rear safe tilts do not occur. While computing the above data values, the control unit 300 preferably continues to direct gantry 12 to the value stored in Seek, D350, which is preferably loaded with the end of track value stored in D322.

Referencing Block 520, control unit 300 directs the gantry to the Rear Pre-soak Position (RPP) D329. Upon the gantry 12 reaching RPP, the control unit 300 suitably directs the top boom 16 and side surface washing mechanisms 14 to deploy, spraying the first pre-soak solution onto the rear of the vehicle 22. During this time, the control unit 300 verifies that the entrance eye sensor 28 is not obscured. If obscured, the control unit 300 re-verifies the entrance eye sensor 28 operation and returns the gantry 12 to the end 49 and verifies the vehicle 22 is not too long.

After spraying the rear of the vehicle 22 with a first pre-soak solution, the control unit 300 preferably stows side wands 14 and changes to a second (higher pH) pre-soak solution and deploys the top boom 16. If the vehicle 22 is too long, the control unit 300 does not deploy the top boom 16 and merely changes to second pre-soak solution.

Control unit 300 then directs the gantry 12 to proceed, preferably at a slow rate of speed, towards the rear of vehicle 22 until it reaches STAR (D327). While the gantry 12 proceeds, the control unit 300 preferably directs top boom 16 to step up towards it's stowed position. In this manner, the present invention suitably reduces vehicle washing time by preferably having the top boom 16 nears its stowed position when gantry 12 reaches STAR.

Referencing Block 521, once gantry 12 has reached STAR (the control unit 300 determines this by comparing D327 with D320) and top boom 16 is stowed, control unit 300 preferably directs the gantry 12 to move to STAF (D326). Control unit 300 preferably receives a top boom safety switch signal 318 which indicates when the top boom 16 is stowed. However, the top boom pulser signal 320 counts may also be suitably utilized by control unit 300 to determine the position of top boom 16 at any time. Control unit 300 preferably directs gantry 12 to travel at the 75 Hz speed. Additionally, if this wash was configured as a 4 pass wash with rocker panels, control unit 300 suitably activates rocker panel valves and the appropriate display signs indicating that both the pre-soak and rocker panel washes are occurring. After reaching STAF, the control unit 300 preferably closes all pre-soak valves and cleans the pressure lines by passing two slugs of water there through.

Referencing Block 522A and 522B, if a two pass wash was selected, the control unit 300 proceeds with passing once towards the rear of vehicle 22 while spraying wash solutions and then returning to the front of vehicle 22 while spraying rinse solutions. Tilts and/or boom deployments at either end of vehicle 22 would preferably be included in such wash routine. Since all of the features and functions of the present invention which are preferably accomplished in a six pass wash are similarly accomplished in a two or four pass wash, only a six pass wash is described in detail herein. However, any number of passes of gantry 12 along vehicle 20 may be suitably accomplished by the present invention.

Referencing Block 523A and 523B, if a four pass wash is selected, the control unit 300 proceeds with passing once towards the rear of vehicle 22 while spraying wash solutions and then returning to the front of vehicle 22 while spraying cleaning solutions, gantry 12 then passes along the length of vehicle 22 and returns to a position beyond the front of vehicle 22. Tilts and/or boom deployments at either end of vehicle 22 would preferably be included in such wash routine.

Referencing Block 524, assuming that the customer selected a six pass wash, after completing pre-soak cycles, the control unit 300 preferably proceeds with applying wash solutions to vehicle 22 during three round-trips. Regardless of which wash option is selected (2 pass, 4 pass, or 6 pass) the control unit 300 preferably directs gantry 12 to begin at the front high pressure position by loading D330 into D350 (Seek) and then proceed between the front high pressure position D330 and the rear high pressure position D331. As such, the present invention preferably positions the gantry 12 at an optimal distance from the vehicle 22 such that when the washing components are deployed, the front and rear of the vehicle 22 is optimally cleaned while conserving resources (water, electricity, cleaning solutions, etc.). Also, by positioning the gantry 12 at an optimal distance from the vehicle 22 and not driving the gantry 12 all the way to either end (i.e., beginning 51 or end 49) of track 20, the current invention reduces wash time and thereby increases the number of vehicles which may be washed in a given time period.

Referencing Block 525, at the same time that any of the wash passes are being conducted or after the wash passes are finished, control unit 300 determines whether rocker panel washes are selected. Referencing Block 526, if selected, rocker panel washes are suitably accomplished.

Referencing Block 527, control unit 300 also suitably determines whether color shine washes are selected. If selected, control unit 300 suitably activates appropriate mechanisms which are utilized in applying color shine solutions to vehicle 22 (Block 528).

Referencing Block 529, control unit 300 suitably determines whether wax options are selected. If selected, the control unit 300 suitably activates the appropriate mechanisms which are utilized in applying wax to vehicle 22 (Block 530).

Referencing Block 531, control unit 300 suitably determines whether a spot free rinse option is selected. If selected, control unit 300 suitably activates appropriate mechanisms which are utilized in applying spot free rinse to vehicle 22 (Block 532).

Referencing Block 533, control unit 300 suitably determines whether dryer options have been selected. If selected, the control unit 300 suitably activates appropriate mechanisms which are utilized to dry the vehicle 22 (Block 534). Dryers may be attached to gantry 12 and included as part of the present invention, or dryers may be free standing, independently operated, as desired.

Referencing Block 535, at this point, the present invention has cleaned a vehicle 22. Control unit 300 provides signals to the exit door which preferably result in the automatic opening of any exit door. Also, appropriate display signs are illuminated which direct the vehicle 22 out of the vehicle washing area 11. Additionally, in the preferred embodiment, the control unit 300 suitably stores parameters associated with each vehicle wash, such as which option was selected, how long the dryer motor was on, elapsed pump "on" time, resources used, and the like. The control unit 300 then returns to Start (Block 500) and awaits selection of another vehicle wash option.

While the present invention has been described as encompassing numerous features, capabilities and configurations it is to be appreciated that the present invention encompasses any and all combinations of these and comparable features and is not to be construed as being limited to techniques, equipment used, or any other element, factor, step or the like without departing from the scope of the present invention as expressed in the following claims.

What is claimed is:

1. A vehicle washing system for automatically cleaning a vehicle having a front end, a rear end, a side and a profile comprising:
   a gantry which travels along a track within a vehicle washing area, wherein the gantry further comprises:
      a gantry pulser which outputs increment signals as the gantry travels from a beginning to an end of the track and outputs decrement signals as the gantry travels from the end to the beginning of the track;
      an inverter which controls the speed and direction of travel of the gantry; and
      a structure for supporting at least one vehicle washing apparatus;
   a vehicle detection system which detects the front end, rear end, and profile when the vehicle is within the vehicle washing area and outputs detection signals indicative thereof;
   at least one vehicle washing component which dispenses cleaning solutions into the vehicle washing area; and
   a control unit which controls the travel of the gantry within the vehicle washing area such that upon receipt of the detection signals, determines the location of the front end, the rear end and locations along the profile relative to the track, controls the travel of the gantry along the track such that the gantry travels a pre-set distance beyond the front end and the rear end of the vehicle, and controls the at least one vehicle washing component such that cleaning solutions are dispensed when the component is within a predetermined proximity of the vehicle.

2. The vehicle washing system of claim 1 wherein positions of said gantry along said track are related to a reference position periodically calibrated and saved by said control unit by moving said gantry to said reference position, assigning a value to said position, and identifying all other positions along said track relative to said reference position as a sum of increment and decrement signals transmitted by said gantry pulser as said gantry travels along said track from said reference position to a second position.

3. The vehicle washing system of claim 2 wherein said vehicle detection system further comprises an entrance sensor mounted on said gantry wherein said entrance sensor detects the presence of said sides of said vehicle as said gantry travels along said track.

4. The vehicle washing system of claim 3 wherein, as said gantry travels from said beginning towards said end of said track, said entrance sensor transmits a vehicle detect signal when said entrance sensor passes a point which is parallel with said front end of said vehicle, continues to transmit said vehicle detect signal while said gantry travels along said sides of said vehicle, and stops transmitting said vehicle detect signal when said entrance sensor passes a point which is parallel with said rear end of said vehicle.

5. The vehicle washing system of claim 4 wherein said control unit records the position of said gantry along said track as a beginning of said vehicle when said entrance sensor begins transmitting said vehicle detect signal and records the position of said gantry along said track as an end of said vehicle when said entrance sensor stops transmitting said vehicle detect signal.

6. The vehicle washing system of claim 5 wherein said vehicle detection system further comprises a clearance sensor mounted to said gantry wherein said clearance sensor detects locations along said side profile of said vehicle which is above a clearance height as said gantry travels along said track.

7. The vehicle washing system of claim 6 wherein said clearance sensor is mounted such that said clearance height is 44 inches above ground.

8. The vehicle washing system of claim 6 wherein, as said gantry travels from said beginning towards said end of said track, said clearance sensor transmits a clearance detect signal when said clearance sensor detects a side of said vehicle which is above said clearance height, continues to transmit said clearance detect signal while said gantry travels along sides of said vehicle which are higher than said clearance height, and stops transmitting said clearance detect signal when said clearance sensor no longer detects sides of said vehicle which are higher than said clearance height.

9. The vehicle washing system of claim 8 wherein said control unit records the position of said gantry along said track as a front safe tilt position when said clearance sensor begins transmitting said clearance detect signal and records the position of said gantry along said track as a rear safe tilt position when said clearance sensor stops transmitting said clearance detect signal.

10. The vehicle washing system of claim 9 wherein said control unit deploys said washing apparatus into said vehicle washing area when said gantry is positioned at specific locations along said track and at all other times stowes said washing apparatus.

11. The vehicle washing system of claim 10 wherein said vehicle washing apparatus further comprises a top boom.

12. The vehicle washing system of claim 11 wherein said control unit deploys said top boom at a pre-set minimum distance from at least one of said front end and said rear end, commands said gantry to travel towards said vehicle, and sends commands to said top boom to incrementally return said top boom to a stowed position as said gantry travels along at least one side of said vehicle.

13. The vehicle washing system of claim 12 wherein said top boom further comprises a top boom pulser which outputs a pulser signal as said top boom is raised and lowered wherein said pulser signal is summed to represent a data value associated with a position of said top boom relative to a reference position.

14. The vehicle washing system of claim 12 wherein said top boom further comprises a top boom safety switch which provides a top boom stowed signal when said top boom is stowed.

15. The vehicle washing system of claim 13 wherein said control unit controls the travel of said gantry along said track such that said top boom is stowed before said gantry reaches said front safe tilt position, when said gantry is traveling from said front end to said rear end of said vehicle, and before said gantry reaches said rear safe tilt position, when said gantry is traveling from said rear end to said front end of said vehicle.

16. The vehicle washing system of claim 15 wherein said vehicle washing apparatus further comprises side wands.

17. The vehicle washing system of claim 16 wherein said control unit deploys said side wands at a pre-set minimum distance in front of said front end and behind said rear end, and stowes said side wands before said gantry reaches the relative position along said track of at least one of said front end and said rear end and while said gantry travels along said sides of said vehicle.

18. The vehicle washing system of claim 17 wherein said side wands include a side wand safety switch which transmits an output signal to said control unit when side wands are stowed.

19. A control system which adjusts the operation of a vehicle washing system based upon a length and side profile of a vehicle such that cleaning solutions are applied directly to those areas of a vehicle wash within which a vehicle is located and not elsewhere wherein said vehicle washing system utilizes at least one vehicle washing component attached to a gantry traveling along parallel tracks, said control system comprising:

an entrance eye sensor which detects a side of said vehicle and generates an entrance eye sensor signal whenever said gantry is along a side of said vehicle;

a clearance eye sensor which detects a location along a side profile of said vehicle and generates a clearance eye sensor signal whenever said gantry is along a side of said vehicle and a portion of said vehicle extends higher than a pre-set distance from ground;

a gantry pulser which transmits gantry pulser signals sending an increment signal when said gantry travels along said track in a forward direction and a decrement signal when said gantry travels in a reverse direction, wherein a sum of said gantry pulser signals represents a position of said gantry along said track relative to a fixed reference; and a control unit wherein said control unit receives and sums said gantry pulser signals, receives said entrance eye sensor signal, receives said clearance eye sensor signals and generates output signals which control the operation of said vehicle washing system based upon said inputs such that vehicle washing apparatus deploy and stowe based upon a profile of a vehicle and such that said gantry travels only a pre-set distance past either end of said vehicle when said vehicle washing apparatus are dispensing cleaning solutions.

20. The control system of claim 19 wherein said control system further comprises:

an air switch which transmits a signal when a vehicle enters said vehicle washing area;

a treadle switch which transmits a signal when a vehicle has traveled into said vehicle washing area to a predetermined stopping point;

a gantry speed inverter signal which outputs a current speed for said gantry;

a top boom pulser signal which output a current relative position of a top boom;

a top boom safety switch signal which outputs a signal when said top boom is stowed; and wash select signals which indicate which of at least two wash options a customer has selected.

21. A method of determining the length and features of a side profile of a vehicle within an automated vehicle washing system and controlling operation of said system based upon said determination comprising:

moving a gantry along a track substantially parallel to said vehicle;

recording the position of said gantry when a first sensor attached to said gantry detects an end of said vehicle;

recording a second position of said gantry when a second sensor attached to said gantry first detects a portion of said vehicle which extends higher than a preset distance above ground;

recording a third position of said gantry when said second sensor no longer detects a portion of said vehicle which extends higher than said preset distance above ground;

recording a fourth position of said gantry when said first sensor detects a second end of said vehicle;

designating the range of track between said first position and said fourth position as a length of said vehicle relative to said track;

designating the range of track between said second position and said third position as a profile of said vehicle relative to said track;

controlling the operation of said gantry such that said gantry travels only a preset distance beyond said first position and said fourth position respectively while activating wash cycles while said gantry travels between said first position and said fourth position;

controlling the deployment of a top boom such that said top boom deploys as said gantry travels from said third position towards said fourth position and from said second position towards said first position;

controlling the stowing of said top boom such that said top boom stowes as said gantry travels from said first position towards said second position, remains stowed between said second position and said third position, and as said gantry travels from said fourth position towards said third position;

controlling the deployment of side wands such that said side wands deploy only when said gantry is positioned beyond at least one of said first position and said fourth position but not when said gantry is positioned along said length of said vehicle.

22. The method of claim 21 wherein said method further comprises the steps of:

controlling the rate of travel of said gantry along said track at the rate said top boom rises from a deployed position to a stowed position and vice versa such that top boom is fully deployed when said gantry is at said first position and said fourth position, and said top boom is completely stowed when said gantry is at said second and said third position.

23. A system for detecting the location and profile of a vehicle within an automated vehicle washing area and providing the detections thereof to a controller of a vehicle washing system, the vehicle washing system including a gantry that travels along a side of a vehicle located within the vehicle washing area, wherein the vehicle has a front end, a rear end, a side and a profile, the system comprising:

an entrance eye sensor, connected to the gantry, which detects the presence of a first end location and a second end location of a vehicle relative to the vehicle washing area; and a clearance eye sensor, connected to the gantry, which detects a profile of the vehicle relative to the vehicle washing area;

whereupon entrance of a vehicle into the vehicle washing area, the controller commands the gantry to travel along a side of the vehicle while the entrance eye sensor detects the first end location and the second end location of the vehicle and the clearance eye sensor detects the profile of the vehicle.

24. The system of claim 23, wherein the first end location is the front end of the vehicle and the second end location is the rear end of the vehicle.

25. The system of claim 23, wherein the entrance eye sensor is located on the gantry at a height such that the entrance eye sensor can detect the front end of the vehicle as the gantry travels along a side of the vehicle.

26. The system of claim 23, wherein the clearance eye sensor is located at a fixed location forty-four (44) inches from a floor of the vehicle washing area.

27. The system of claim 23, wherein the clearance eye sensor operates at a frequency such that the operation of the clearance eye sensor is not susceptible to interference from the entrance eye sensor.

28. The system of claim 23, wherein the system further comprises an exit eye sensor which detects whether the vehicle is improperly positioned within the vehicle washing area.

29. The system of claim 28, wherein the controller determines whether the vehicle is improperly positioned within the vehicle washing area by determining whether the exit eye sensor signal is obscured by the vehicle when a signal is initially received from a treadle switch.

30. A method of detecting the location and profile of a vehicle within an automated vehicle washing area and providing the detections thereof to a controller of a vehicle washing system, the vehicle washing system including at least one apparatus for cleaning a vehicle within the vehicle washing area, the apparatus being mounted to a gantry that travels along a side of a vehicle within the vehicle washing area, wherein the vehicle has a front end, rear end, a side and a profile, the method comprising:

detecting the presence of a front end location and a rear end location of a vehicle relative to the vehicle washing area; and detecting a profile of the vehicle relative to the vehicle washing area;

wherein the detection of the front end location, rear end location and profile are accomplished as a gantry, upon which are mounted a first sensor for detecting the front end and rear end locations and a second sensor for detecting the profile, travels along a side of a vehicle within the vehicle washing area.

31. A vehicle washing system for automatically cleaning a vehicle having a front end, a rear end, a side and a profile comprising:

a gantry which travels along a side of a vehicle located within a vehicle washing area;

a vehicle detection system, which detects a front end, a rear end and a profile of the vehicle and outputs detection signals indicative thereof, further comprising:

an entrance eye sensor, which detects the front end and the rear end of the vehicle; and a clearance eye sensor, which detects the profile of the vehicle;

a vehicle washing component which dispenses at least one cleaning solution utilized to clean the vehicle; and a control unit which controls the travel and operation of the gantry and the vehicle washing component; whereupon receipt of the detection signals from the vehicle detection system, the control unit determines the location of the front end, the rear end and the profile of the vehicle relative to the vehicle washing area, controls the travel of the gantry along the side of the vehicle such that the gantry travels a preset distance beyond the front end and the rear end of the vehicle, and controls the vehicle washing component such that cleaning solutions are dispensed when the apparatus is within a predetermined proximity of the vehicle.

32. The vehicle washing system of claim 31, wherein the entrance eye sensor is located on the gantry at a height such that the entrance eye sensor can detect the front end of the vehicle as the gantry travels along a side of the vehicle.

33. The vehicle washing system of claim 31, wherein the clearance eye sensor is located at a fixed location forty-four (44) inches from a floor of the vehicle washing area.

34. The vehicle washing system of claim 31, wherein the clearance eye sensor operates at a frequency such that the operation of the clearance eye sensor is not susceptible to interference from the entrance eye sensor.

35. The vehicle washing system of claim 31, wherein the vehicle detection system further comprises an exit eye sensor which detects whether the vehicle is in an improper location within the vehicle washing area.

36. The vehicle washing system of claim 35, wherein the controller determines whether the vehicle is improperly positioned within the vehicle washing area by determining whether the exit eye sensor is obscured by the vehicle when a signal is initially received from a treadle switch.

37. The vehicle washing system of claim 31, wherein the gantry further comprises a gantry pulser which outputs signals as the gantry travels along the track, wherein the output signals are utilized by the control unit to determine the location of the front end, the rear end and the profile of the vehicle relative to the track.

38. The vehicle washing system of claim 31, wherein the gantry further comprises an inverter which controls the speed and direction of travel of the gantry.

39. A vehicle washing system for automatically cleaning a vehicle having a front end, a rear end, a side and a profile comprising:
 a gantry, which travels along a track within a vehicle washing area, further comprising a gantry pulser which outputs a signal as the gantry travels along the length of the track;
 a vehicle detection system, which detects a front end, a rear end and a profile of the vehicle when the vehicle is within the vehicle washing area and outputs detection signals indicative thereof; and
 a control unit which, upon receipt of at least one signal indicating a location of the front end, the rear end and the profile of the vehicle, determines the position of the gantry relative to the track based upon a reading of the gantry pulser, controls the travel of the gantry along the track such that the gantry travels a pre-set distance beyond the front end and the rear end of the vehicle, and controls a vehicle washing component such that cleaning solutions are dispensed when the component is within a predetermined proximity of the vehicle.

40. A method of automatically cleaning a vehicle having a front end, a rear end, a side and a profile comprising:
 traveling a gantry along a side of a vehicle located within a vehicle washing area;
 detecting a location of the front end and the rear end of a vehicle by utilizing an entrance eye sensor connected to the gantry, wherein the entrance eye sensor generates a signal indicating a location of at least one of the front end and the rear end when the entrance eye sensor is interrupted by the presence of the vehicle within the vehicle washing area;
 determining the profile of the vehicle by utilizing a clearance eye sensor that generates a signal indicating the profile of the vehicle when the clearance eye sensor is interrupted by the presence of the vehicle within the vehicle washing area; and
 automatically dispensing cleaning solutions onto the vehicle by controlling the travel of the gantry along the side of the vehicle and the dispensing of cleaning solutions during the travel of the gantry such that cleaning solutions are dispensed onto the vehicle within an area identified by the front end and the rear end of the vehicle, and at least one cleaning apparatus is positioned above the vehicle according to the profile of the vehicle.

41. The method of claim 40, wherein the method further comprises:
 determining the position of the gantry along the side of the vehicle based upon an accumulation of at least one signal received from a gantry pulser, wherein the gantry pulser outputs positive signals as the gantry travels in a first direction along a track and, the gantry pulser outputs negative signals as the gantry travels in an opposite direction along the track.

* * * * *

UNITED STATES PATENT AND TRADEMARK OFFICE
CERTIFICATE OF CORRECTION

PATENT NO. : 6,277,207 B1
DATED : August 21, 2001
INVENTOR(S) : David M. Gauthier It is certified that error appears in the above-identified patent and that said Letters Patent is hereby corrected as shown below:

Column 7,
Line 53, delete "1" and insert -- 11 --; and

Column 10,
Line 15, delete "owered" and insert -- lowered --.

Signed and Sealed this

Thirtieth Day of April, 2002

Attest:

Attesting Officer

JAMES E. ROGAN
Director of the United States Patent and Trademark Office